Feb. 14, 1933.  H. P. McCANN ET AL  1,897,911
HEAT TREATING FURNACE
Filed Aug. 7, 1930  16 Sheets-Sheet 1
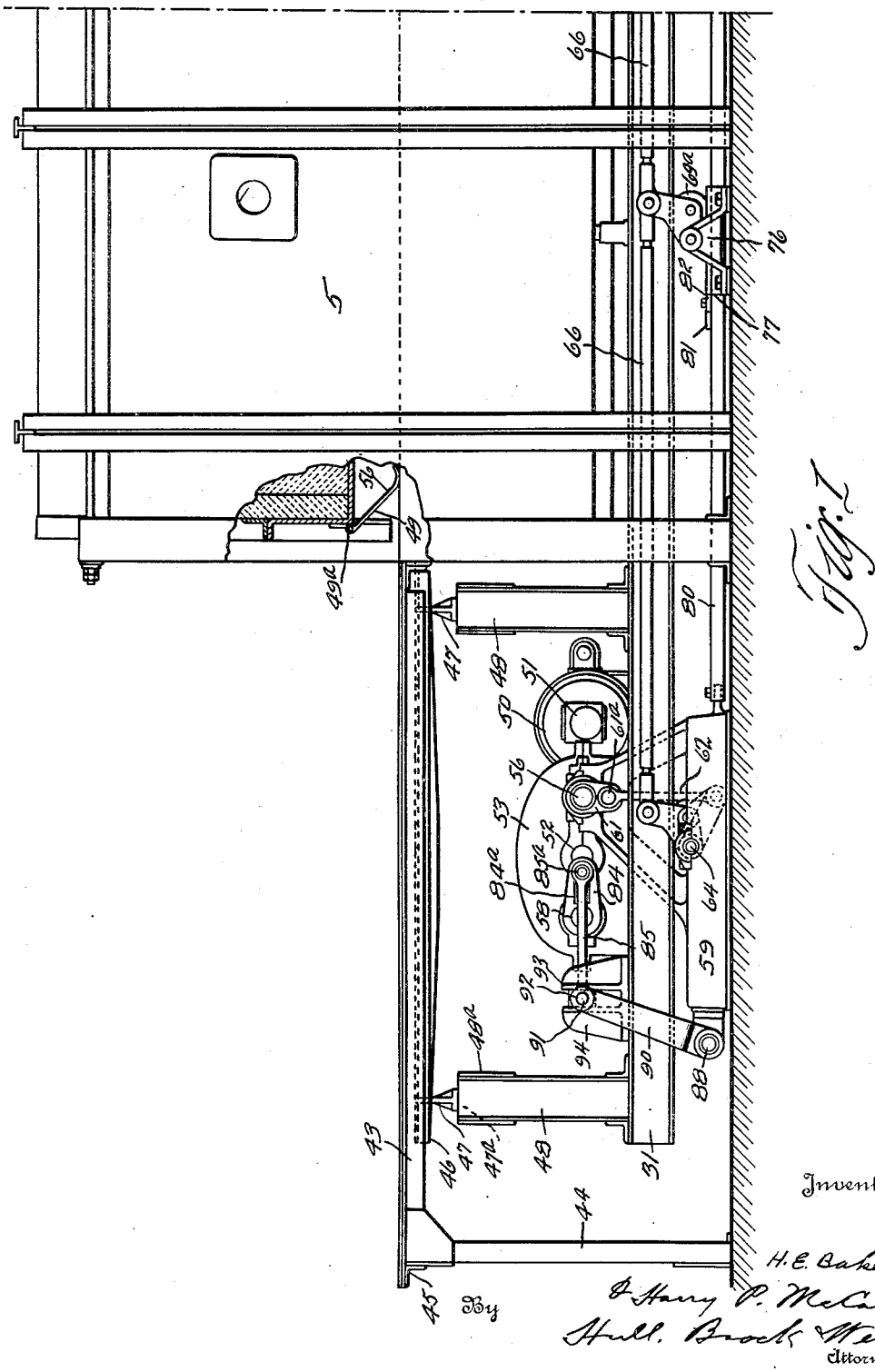

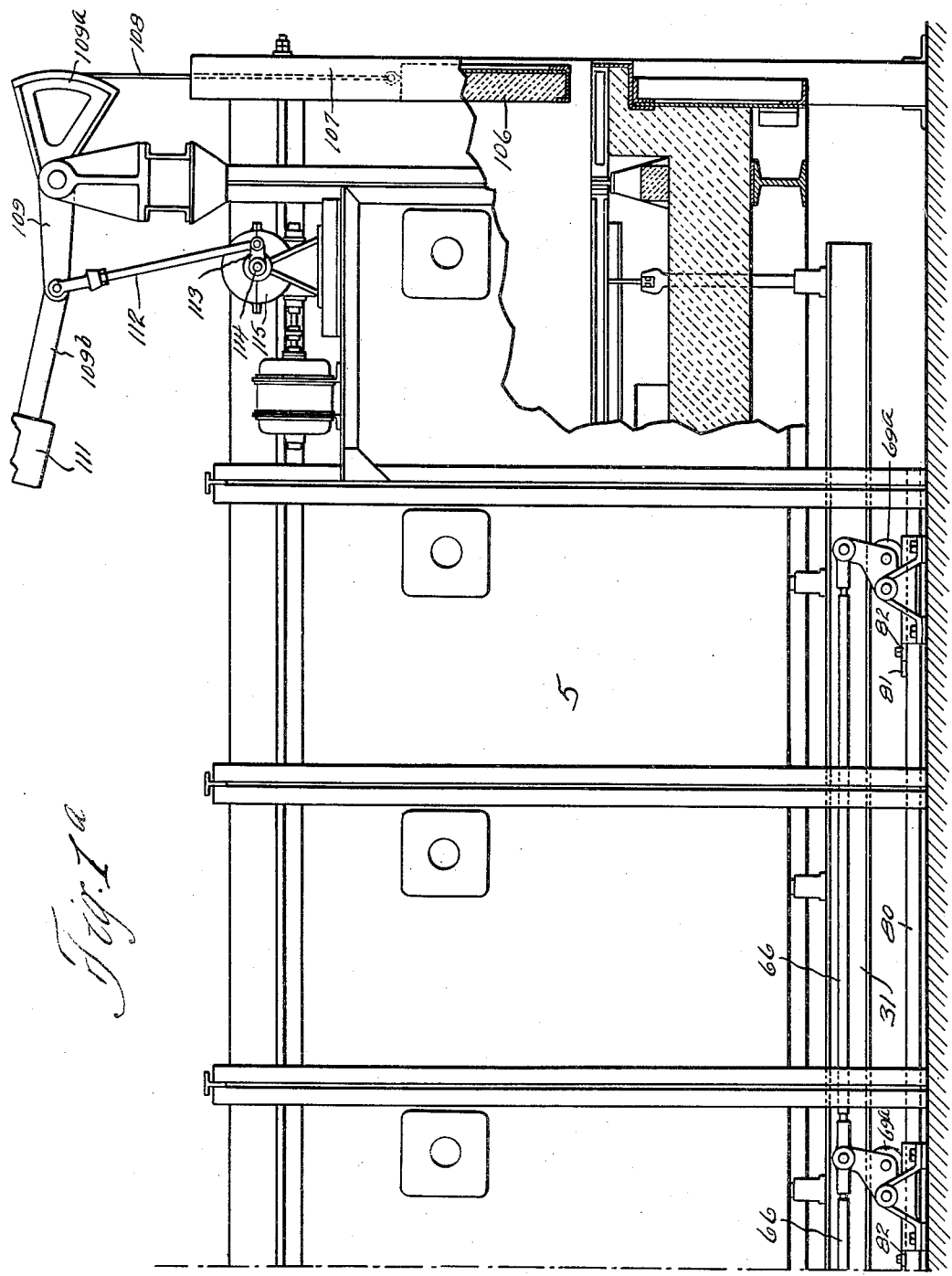

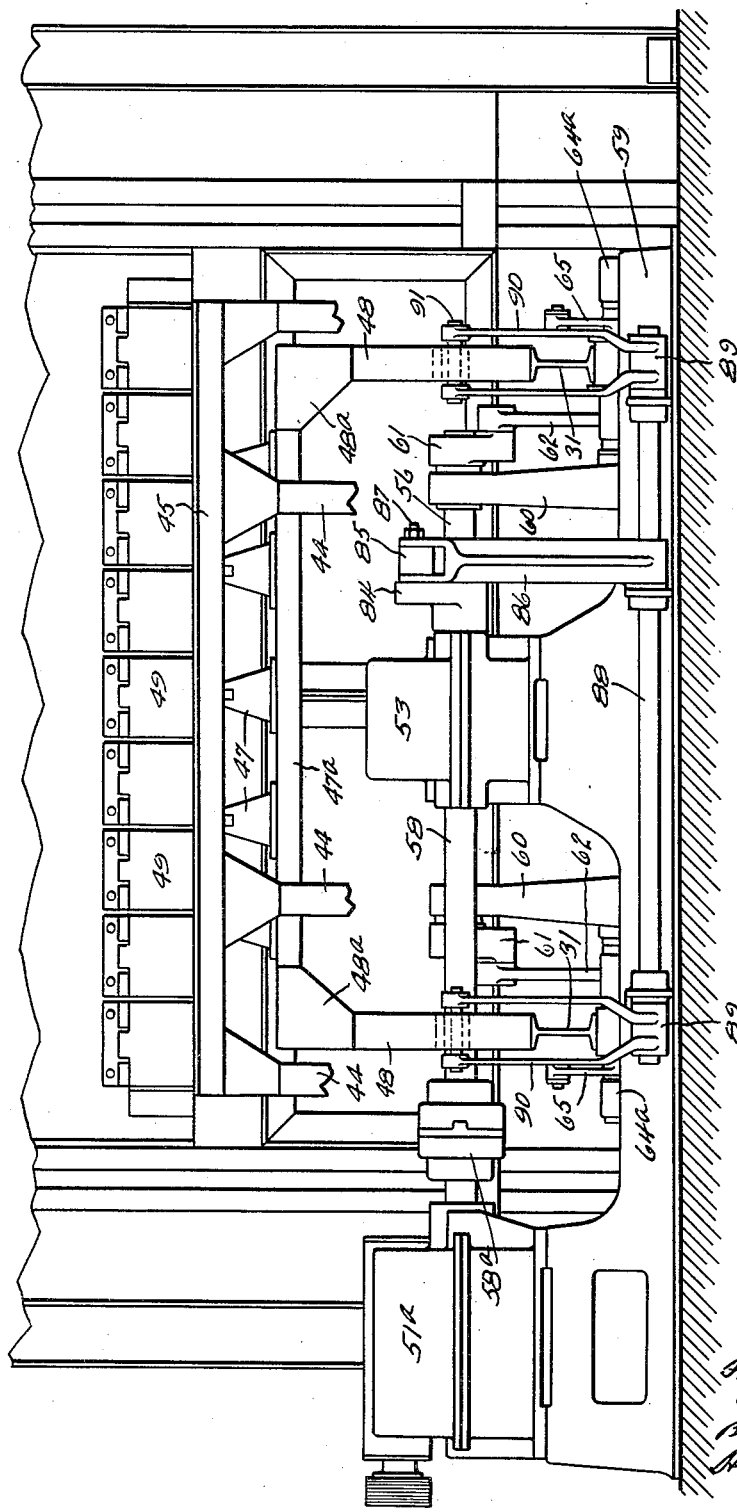

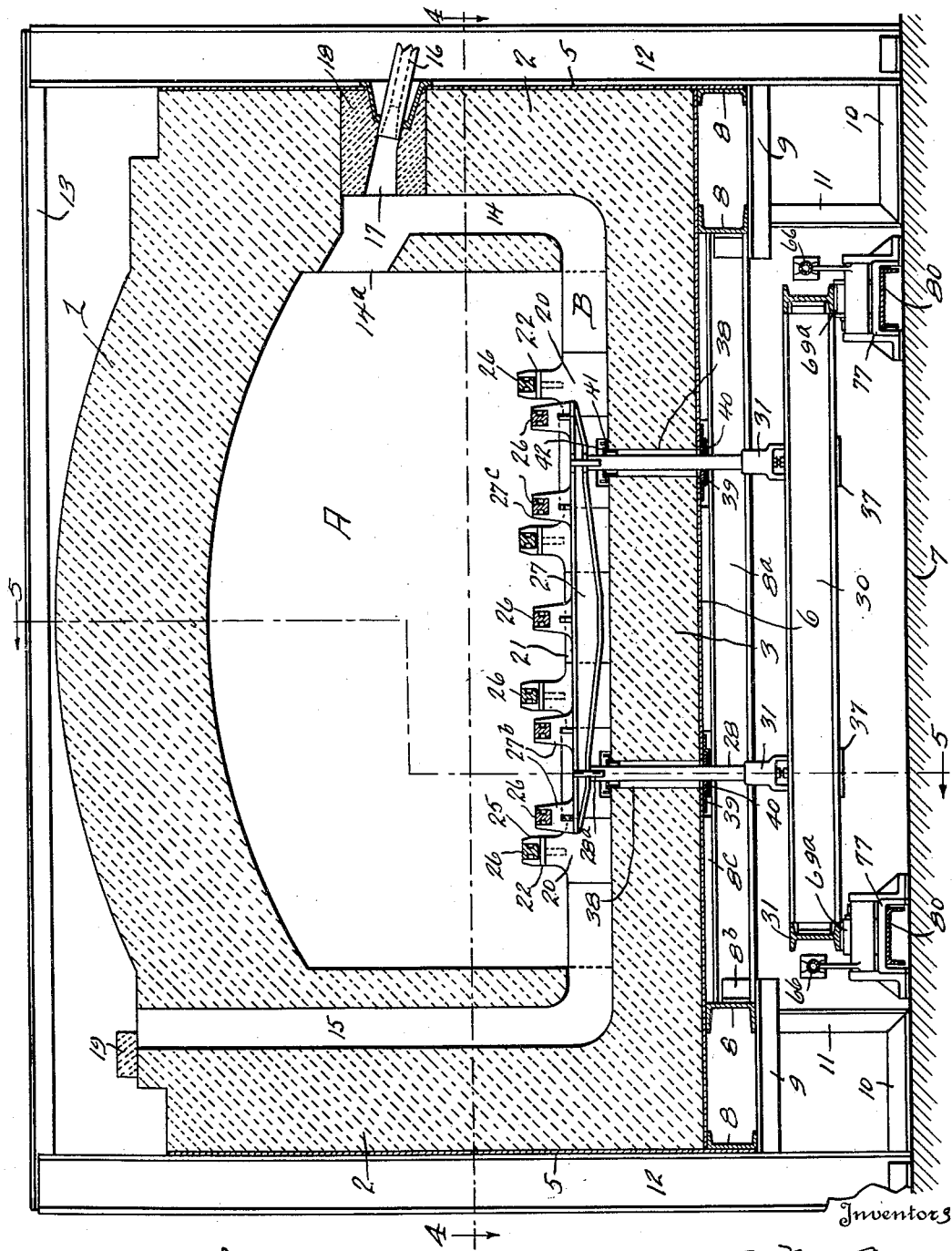

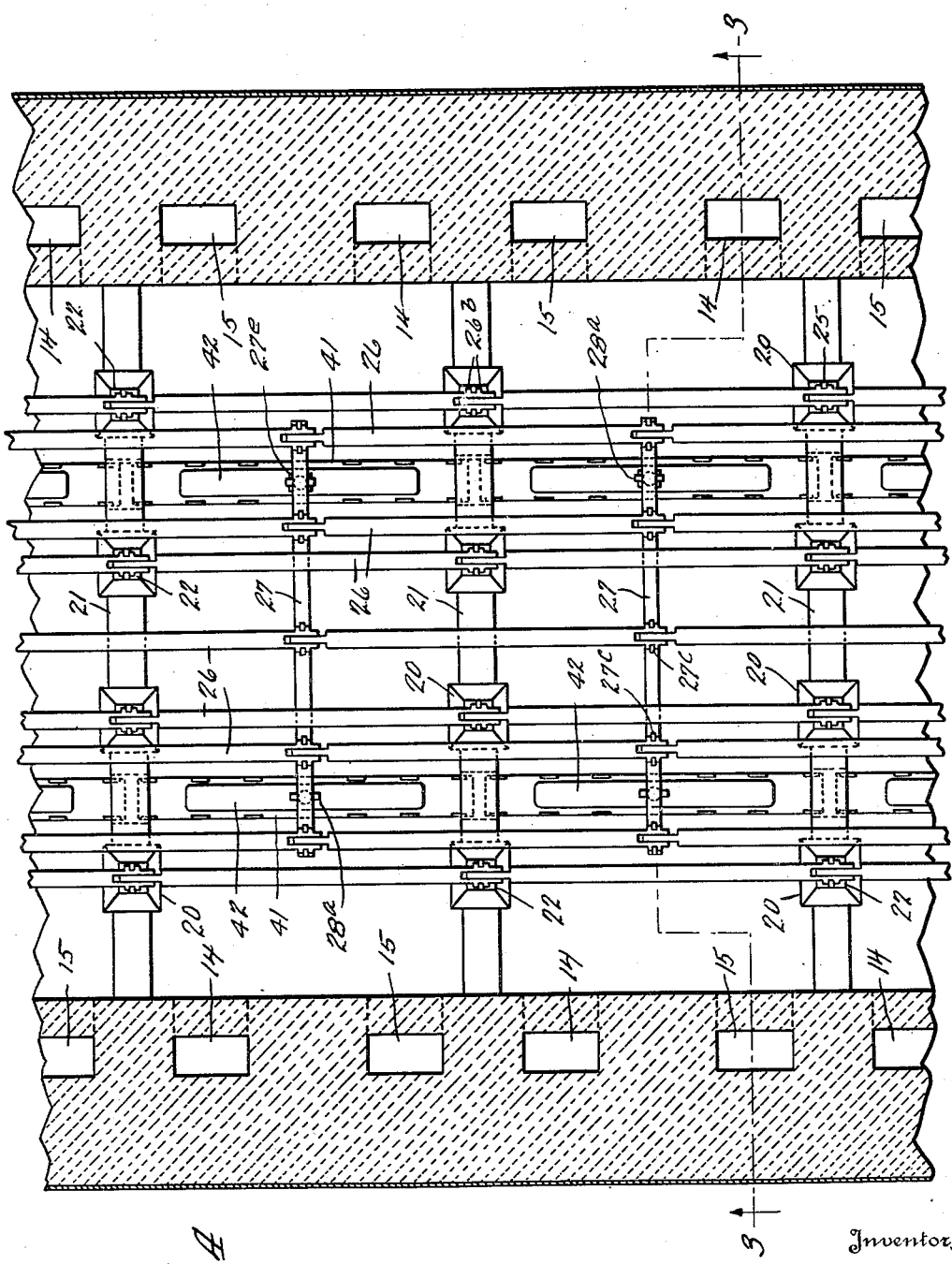

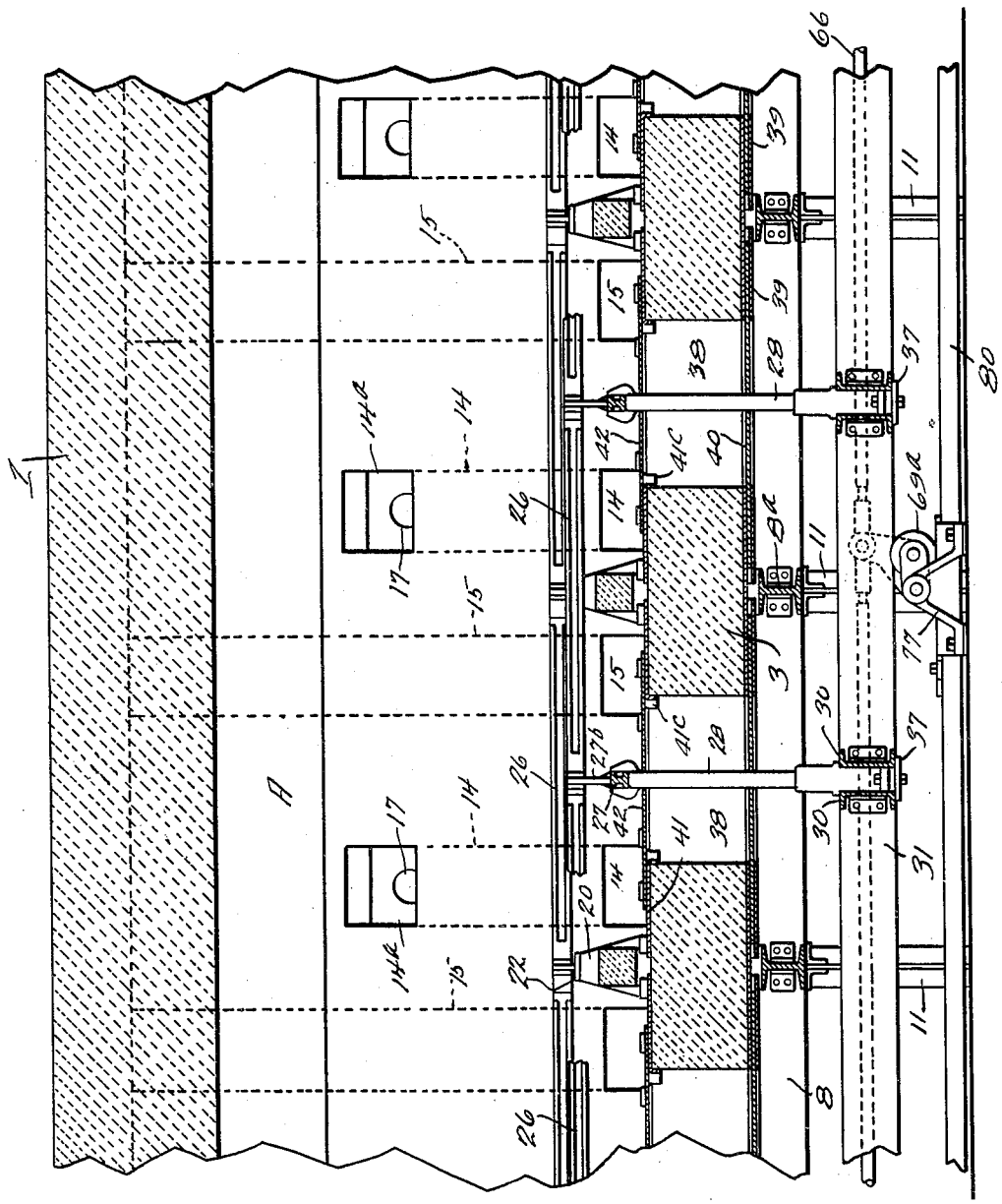

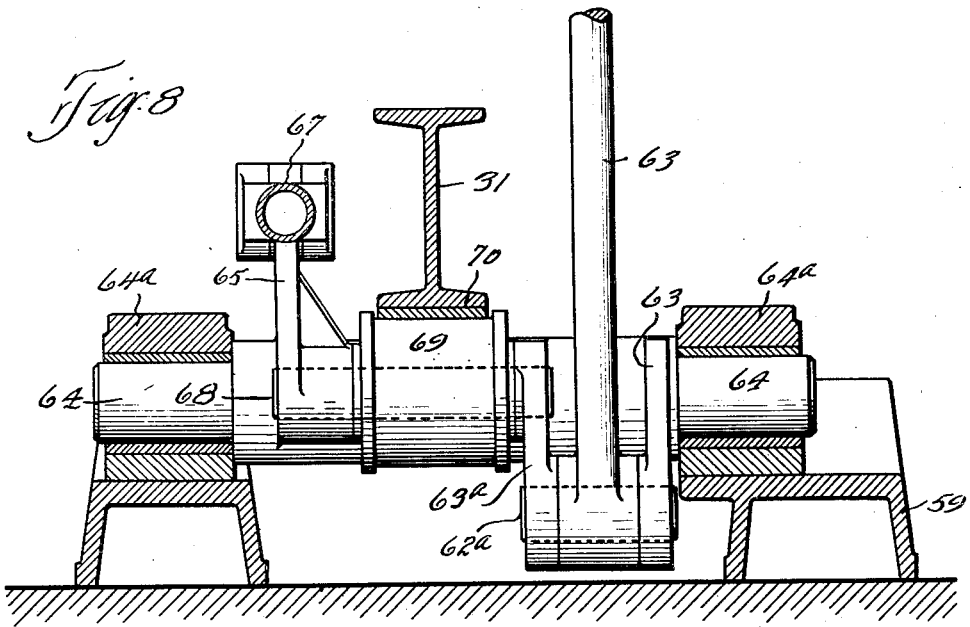
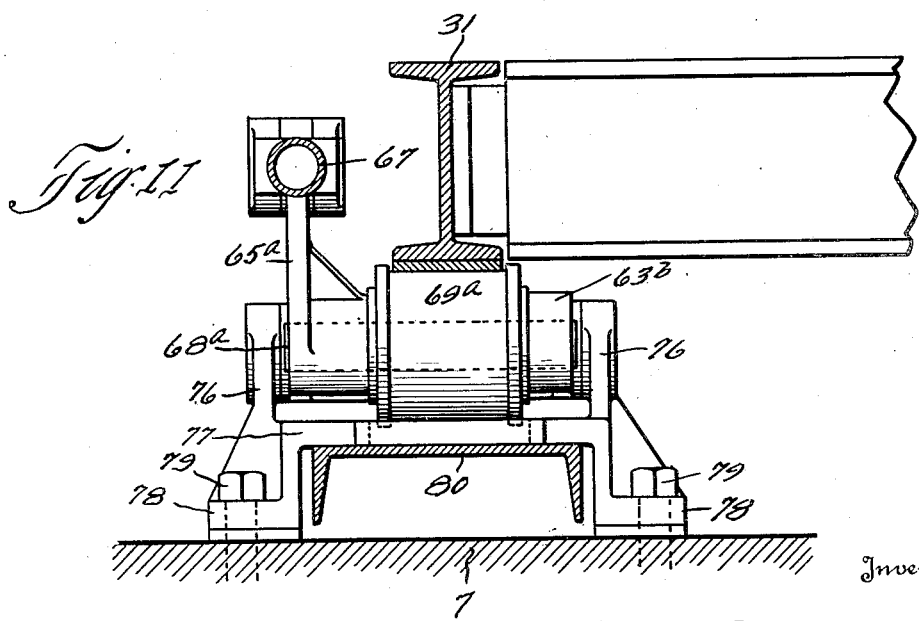

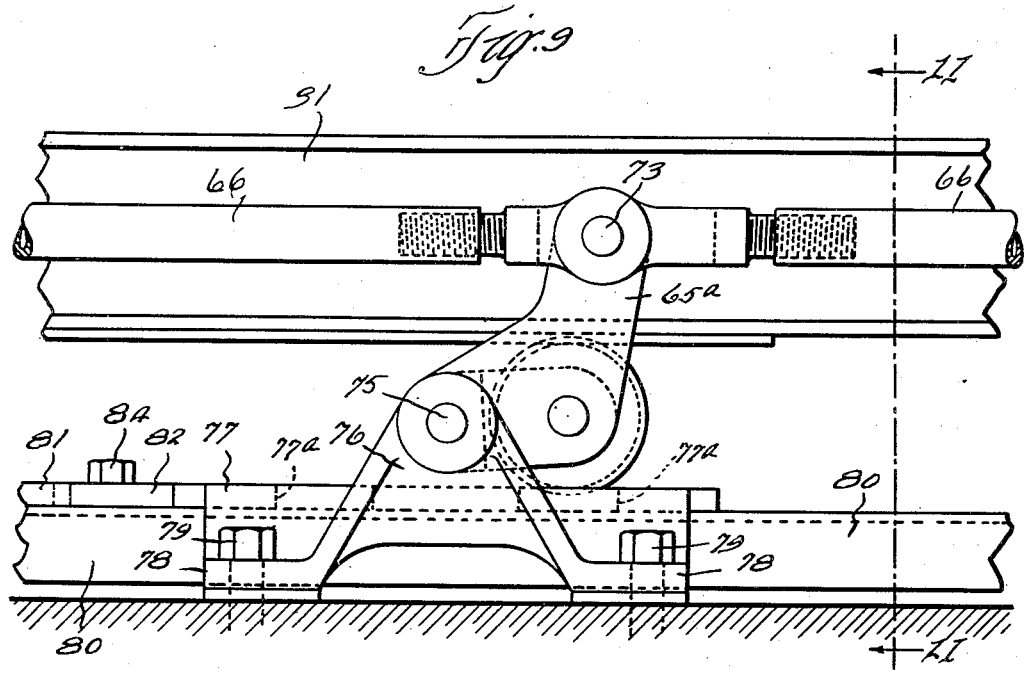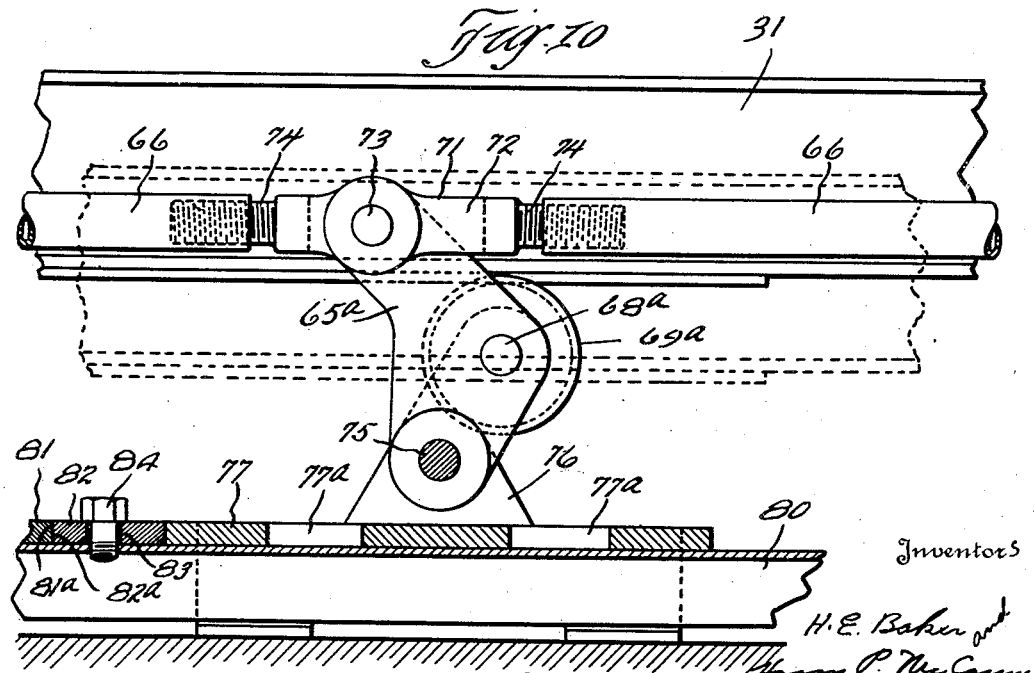

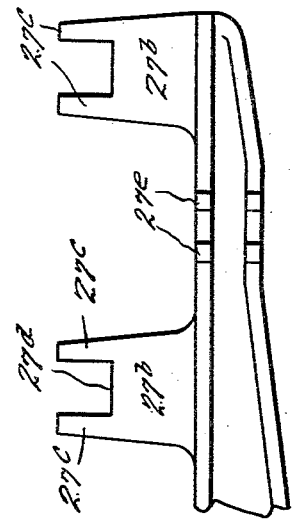
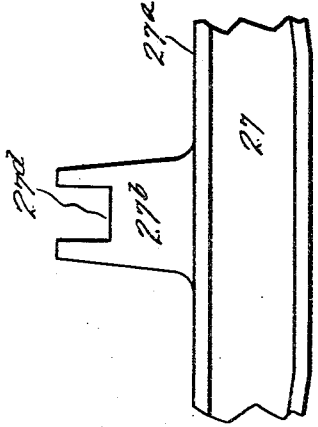
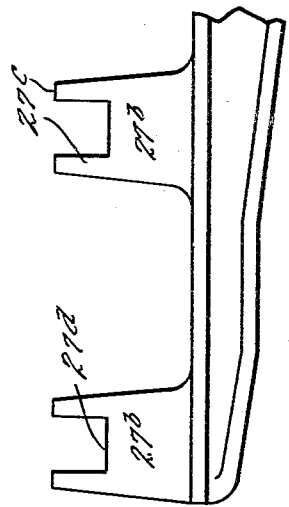
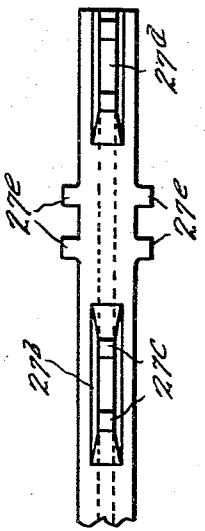
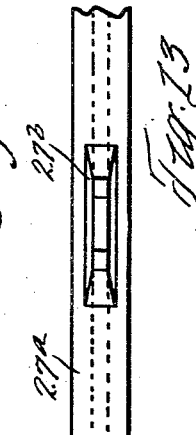
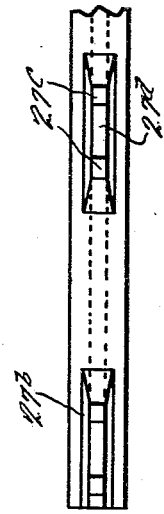
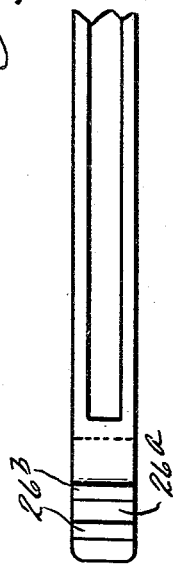

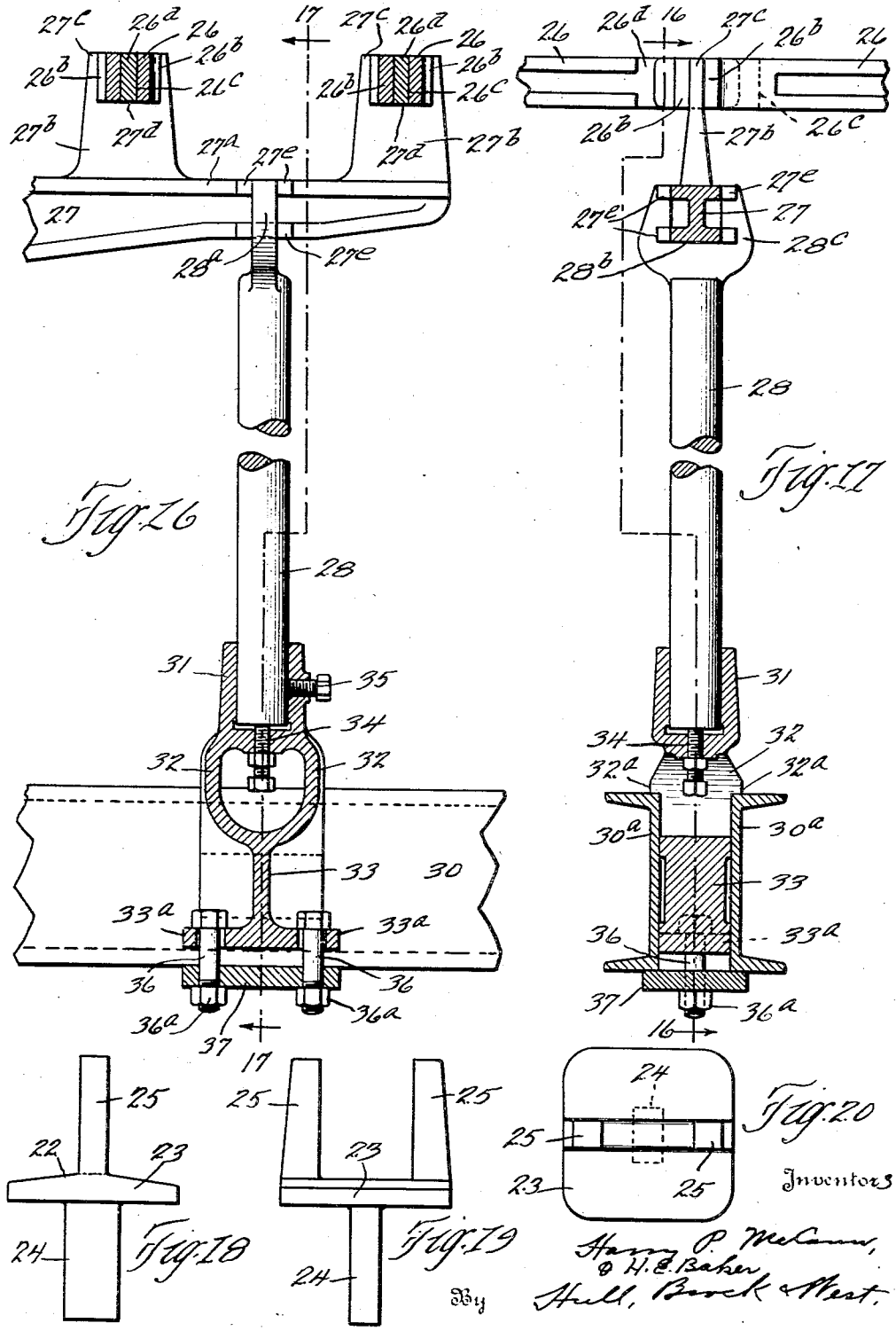

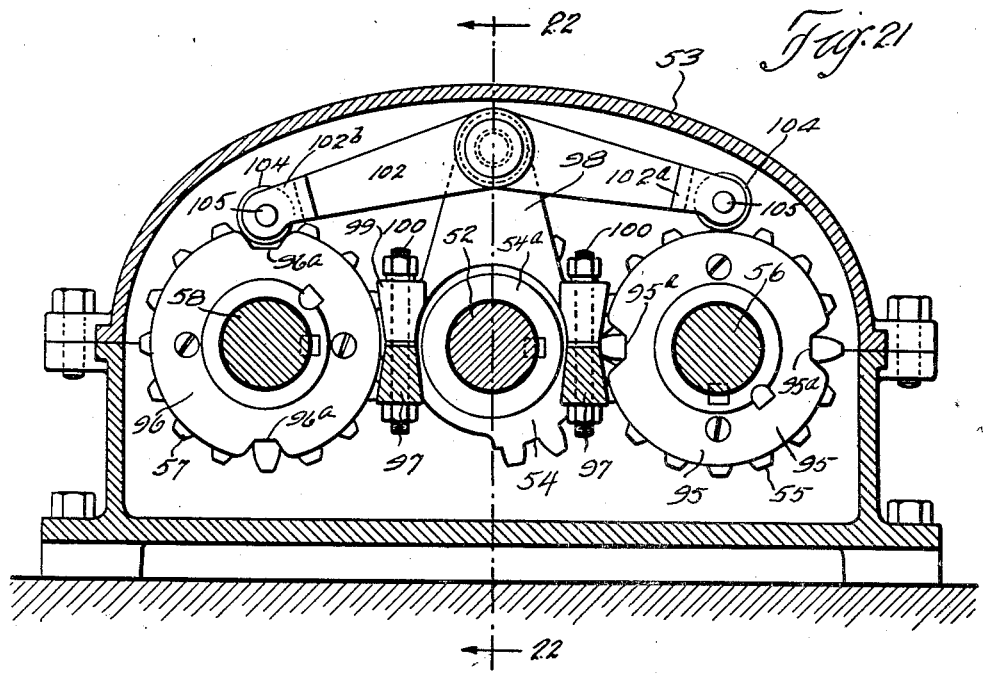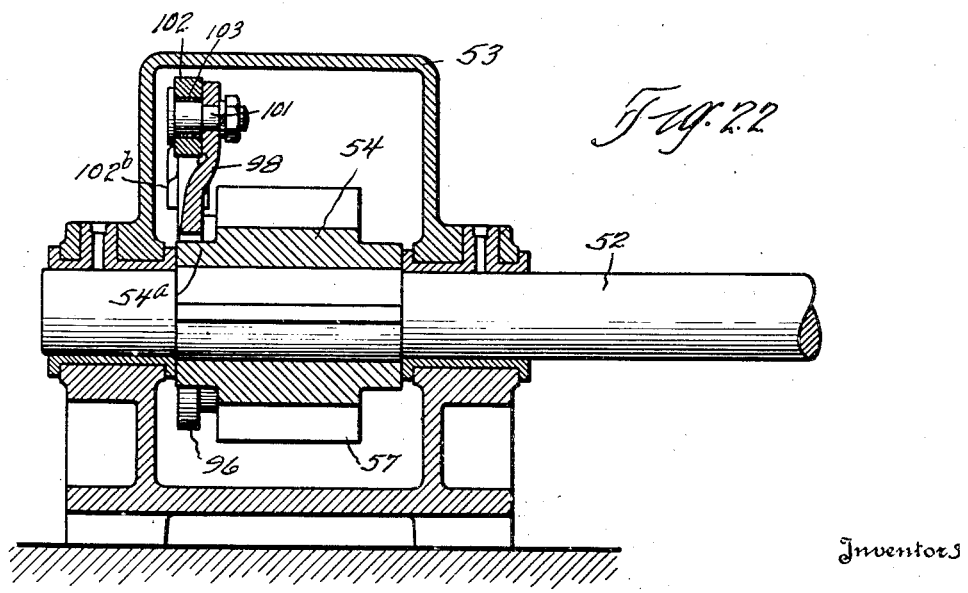

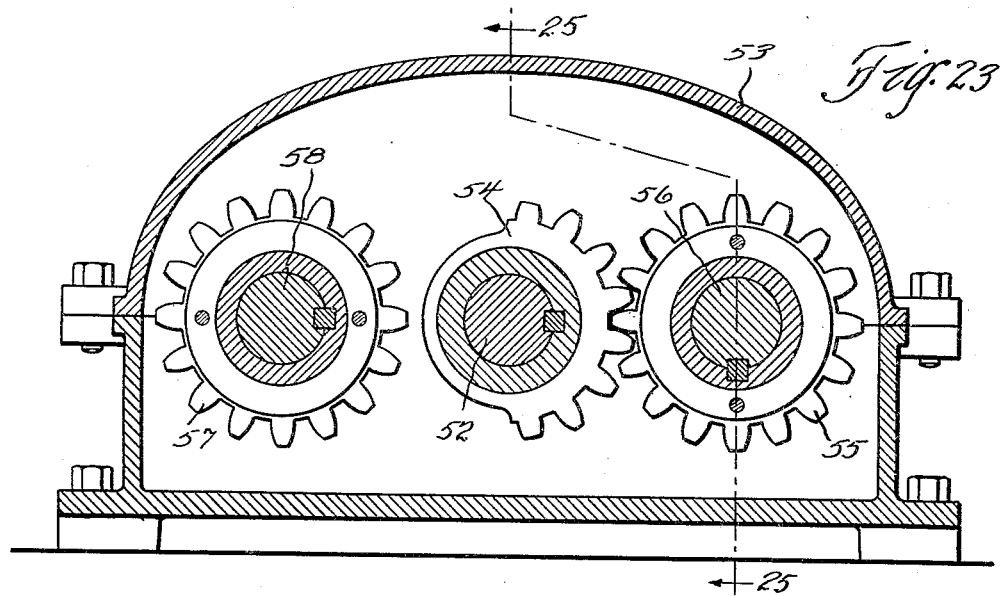
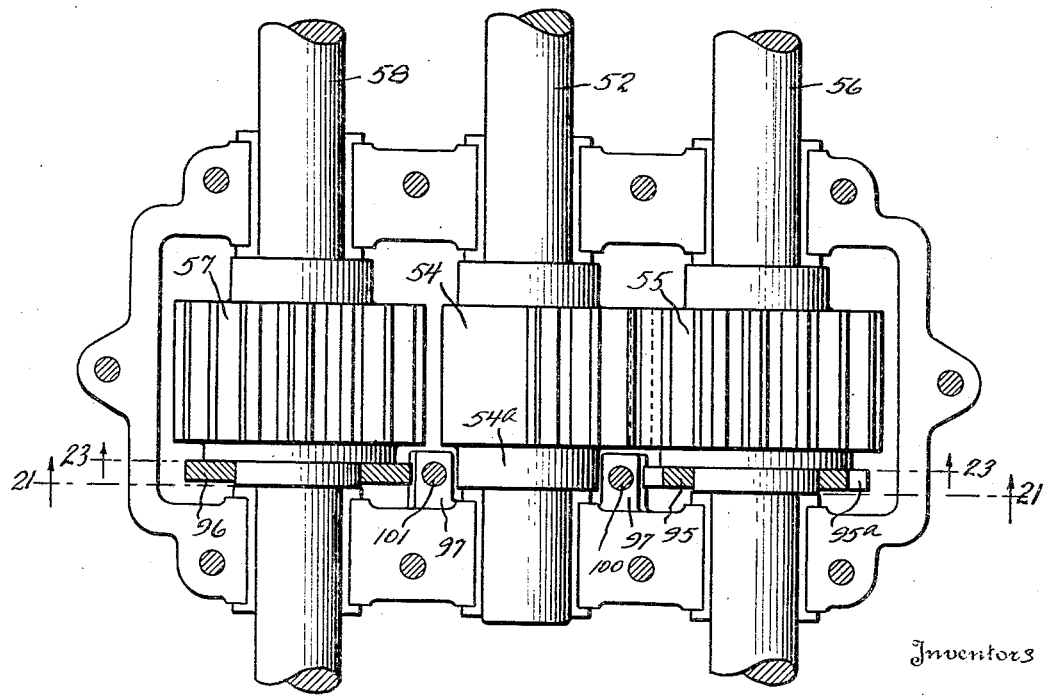

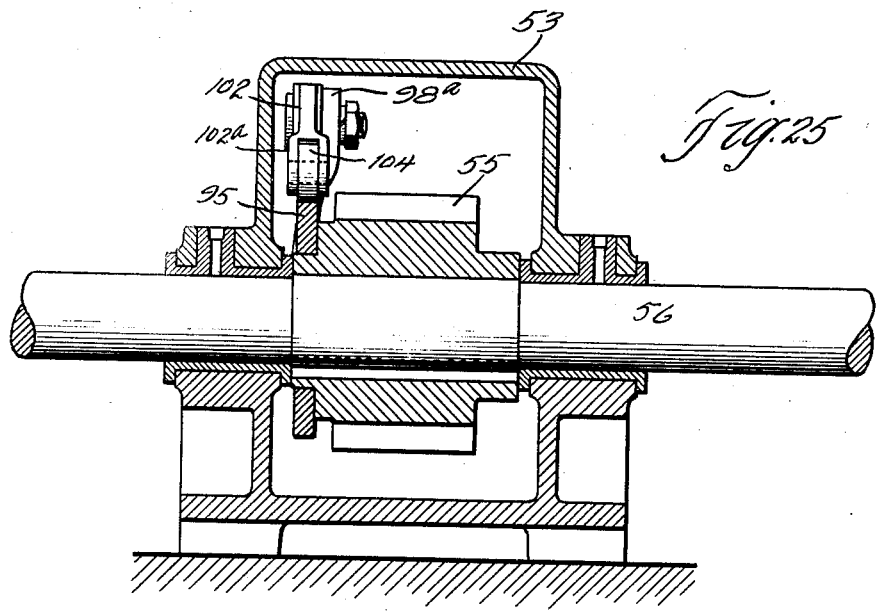
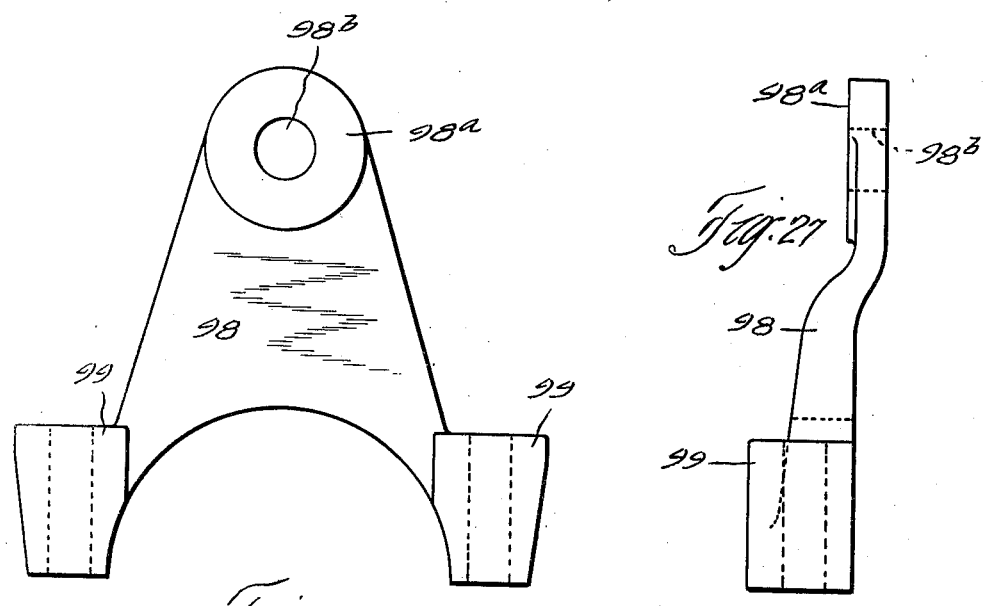

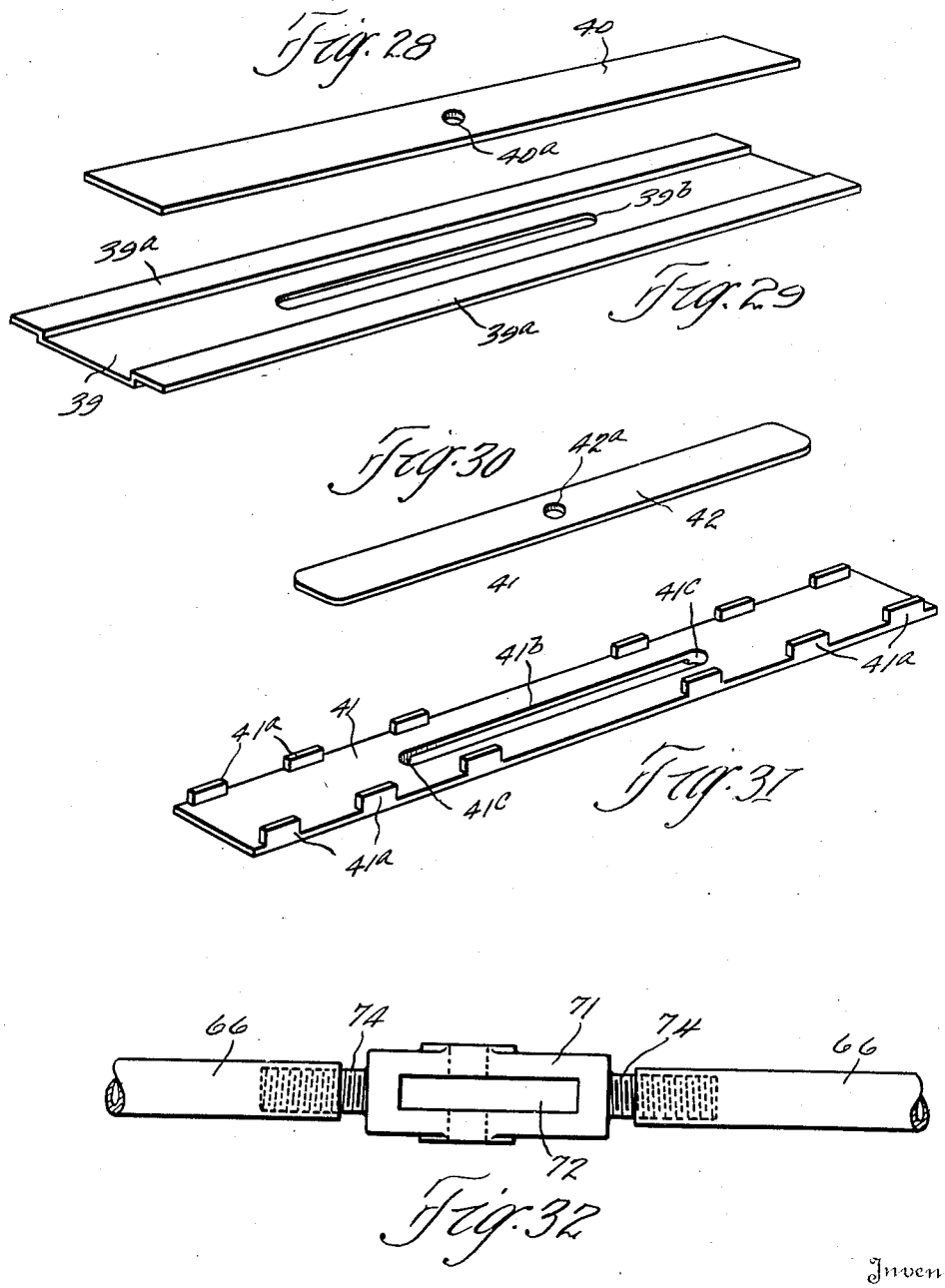

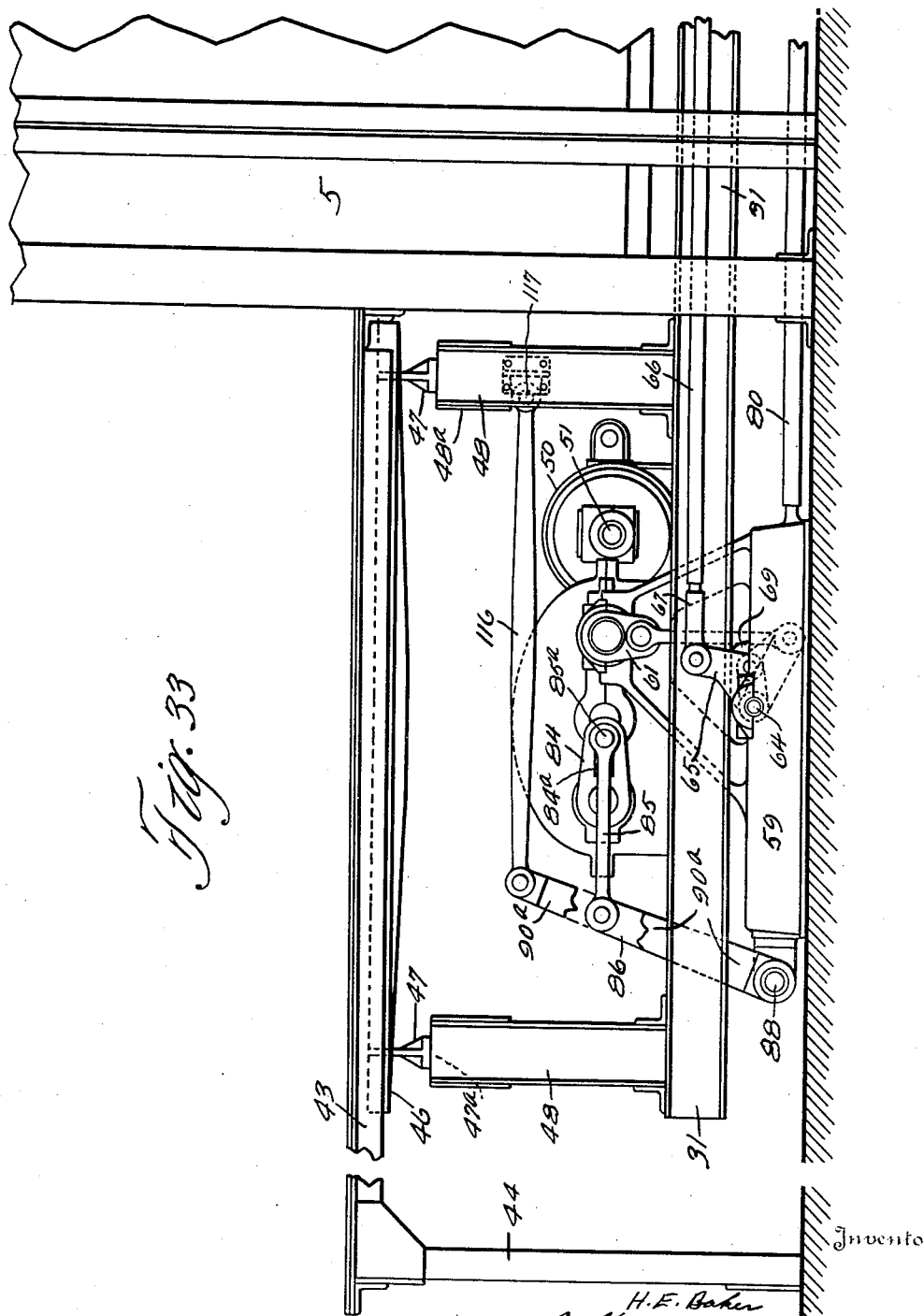

Patented Feb. 14, 1933                                                                    1,897,911

UNITED STATES PATENT OFFICE

HARRY P. McCANN AND HUBERT E. BAKER, OF CLEVELAND, OHIO, ASSIGNORS, BY MESNE ASSIGNMENTS, TO THE FOUNDRY EQUIPMENT COMPANY, OF CLEVELAND, OHIO, A CORPORATION OF OHIO

HEAT TREATING FURNACE

Application filed August 7, 1930. Serial No. 473,724.

This invention relates generally to furnaces used for metallurgical purposes, through which the articles to be treated are conveyed at such rate of travel with reference to the furnace-chamber length as to enable the articles to be properly heated by the time they shall have reached the delivery or discharge ends of such furnaces.

Among the general objects of our invention are:—to provide improved and efficient means for heating the furnaces of this character and for circulating the products of combustion in proper and efficient relation to the hearth and to the articles being conveyed through the furnace in connection with such hearth; to provide improved and efficient means for conveying the articles or materials through the furnace; to provide a furnace construction wherein the supports for the conveyor grid as well as the operating machinery are located beneath the furnace proper, where they are not liable to injury and distortion by the heat from the latter, but where they are accessible for repair and adjustment; to provide novel and efficient means for raising and lowering and traversing the movable grid; to provide a rail construction for the fixed and movable grids which will allow for contraction and expansion due to temperature changes without injury to such rails; and to provide improved means for supporting the fixed and movable grids whereby injury to the grids and the supports is avoided.

Figure 6:
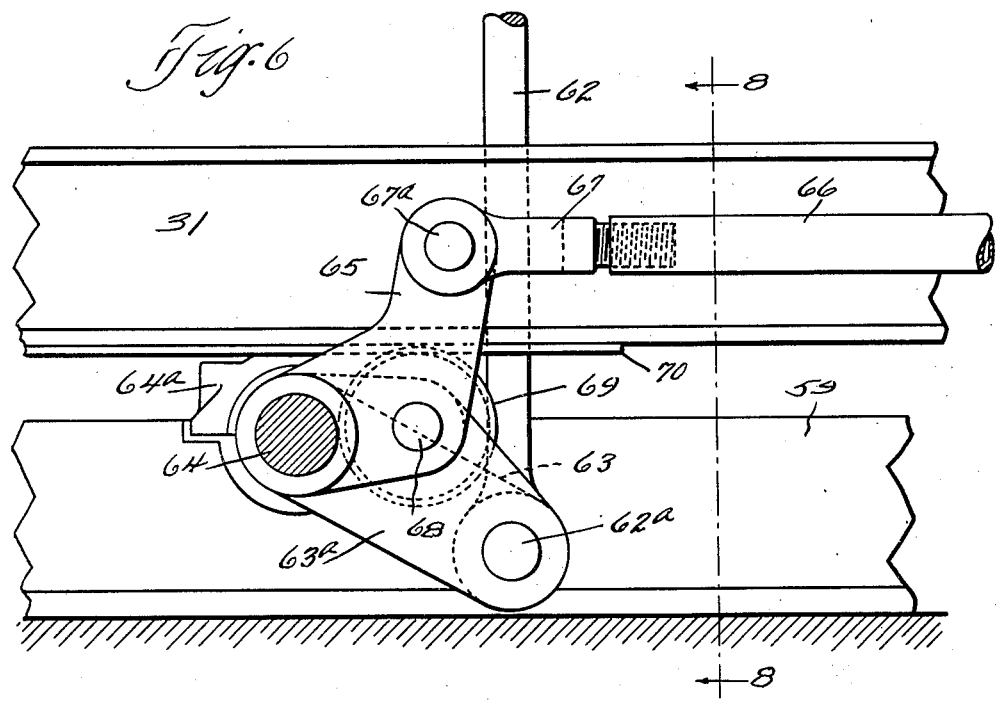
Figure 7:
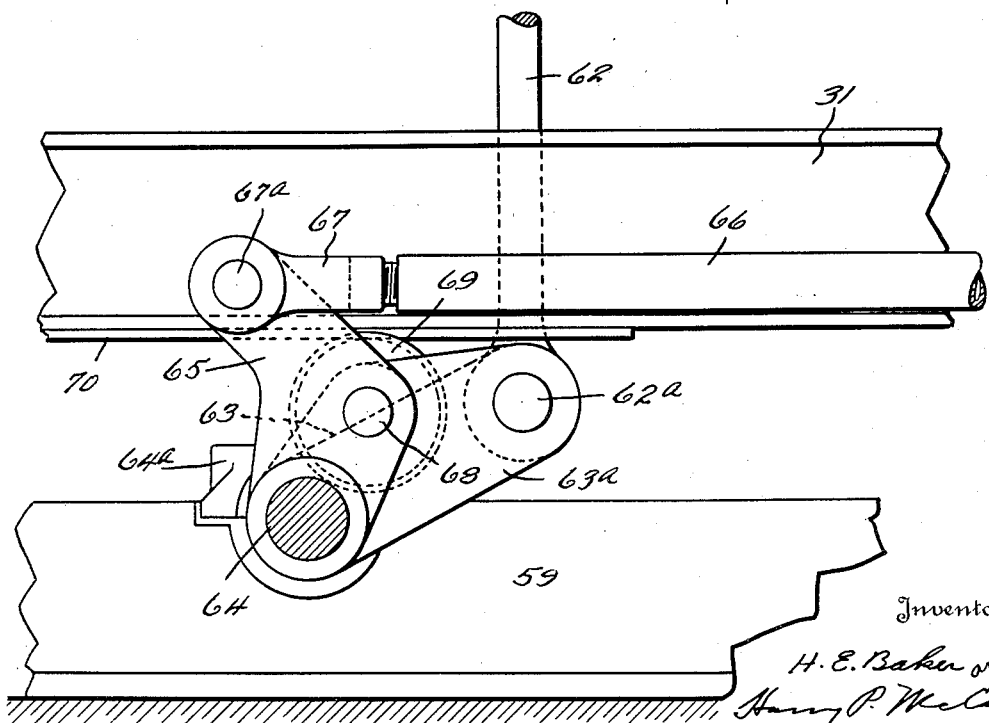

Further and more limited objects of the invention will appear hereinafter in connection with the detailed description of the drawings, wherein Figs. 1 and 1ª jointly represent a side elevation, with parts broken away, of a furnace constructed in accordance with our invention; Fig. 2 an elevation of the front or receiving end of the furnace; Fig. 3 a transverse sectional view through the furnace corresponding substantially to the line 3—3 of Fig. 4; Fig. 4 a detail in horizontal section taken on the line 4—4 of Fig. 3; Fig. 5 is a detail in section corresponding substantially to the line 5—5 of Fig. 3; Figs. 6 and 7 are details in elevation of one of the movable grid-lifting units adjacent to the charging end of the furnace, certain parts being shown in section; Fig. 8 a detail in section corresponding to the line 8—8 of Fig. 6; Figs. 9 and 10 are views, similar to Figs. 6 and 7 respectively, showing one of the intermediate lifting units and its mountings; Fig. 11 a detail in section corresponding to the line 11—11 of Fig. 9; Fig. 12 a side elevation and Fig. 13 a plan view of one of the transverse lifting beams; Fig. 14 a side elevation and Fig. 15 a plan view of one of the rail sections; Fig. 16 a detail in sectional elevation of one of the lifting posts, showing the manner of connecting the same to an upper transverse lifting beam and to a bottom transverse lifting beam, the view corresponding substantially to the line 16—16 of Fig. 17; Fig. 17 a detail in sectional elevation corresponding to the line 17—17 of Fig. 16; Figs. 18 ang 19 are views in elevation, taken at right angles to each other, of one of the supports employed for the stationary rails and Fig. 20 a plan view of one of such supports; Fig. 21 a transverse sectional view through the transmission housing and the transmission mechanism therein, the view corresponding substantially to the line 21—21 of Fig. 24; Fig. 22 a detail in section through the said housing, corresponding to the line 22—22 of Fig. 21; Fig. 23 a detail in section corresponding to the line 23—23 of Fig. 24 and Fig. 24 a detail in plan of the lower portion of the transmission housing and of the shafts and gearings therein; Fig. 25 a detail in section corresponding substantially to the line 25—25 of Fig. 23; Fig. 26 a front elevation and Fig. 27 a side elevation of the yoke which supports the locking lever or beam for the traversing and lifting shafts; Fig. 28 a detail in perspective of one of the plates for closing the bottoms of the slots in which the lifting and traversing posts operate and Fig. 29 a similar view of a plate which cooperates with the plate shown in Fig. 28 to prevent the escape of gases during the traversing stroke of the posts; Fig. 30 a view in perspective of one of the plates which closes the tops of the slots through which the said posts project and Fig. 31 a similar view of one of the plates which cooperates with the plate shown in Fig. 30 to prevent the escape of gases through the slot with which said plates cooperate; Fig. 32 a detail in plan of the connection between one of the lifting units and the rod connecting the same to other units; and Fig. 33 a side elevation of the receiving end of the furnace, showing a modification of the means for connecting the drive shaft with the traversing beams.

Furnace chamber proper

The furnace chamber proper consists of an arched top 1, sides 2 and a bottom 3, of suitable refractory material, the sides and bottom being covered by suitable sheet-metal sheathing indicated at 5 and 6 (see Fig. 3). The furnace is supported upon a foundation 7 by means of longitudinal beams 8 supported in turn from said foundation by footing frames consisting each of an upper carrying member 9, a lower member 10, and a vertical member 11; the outer ends of the frames being connected to and bearing against the vertical structural posts 12, which are connected at their tops by cross members 13. The inner beams 8 are braced by transverse beams $8^a$ secured thereto by angle clamps $8^b$ and having their ends resting on opposed members 9. The beams $8^a$ support the bottom of the furnace between the longitudinal beams 8 by means of supporting blocks $8^c$, which are spaced apart, for a purpose to be described hereinafter.

Each side wall 2 of the furnace is provided with alternating vertical flues 14 and 15, each flue communicating at its bottom with the bottom of the combustion chamber A as well as with transverse slots or flues B in the space below the hearth, which will be described hereinafter. Each flue 14 discharges into the upper portion of the combustion chamber through an upwardly and inwardly directed extension $14^a$ of said flue; and into this extension a burner 16 discharges, the burner communicating with such flue extension by means of a Venturi opening 17 formed in a plug 18 of suitable refractory material.

It will be noted that the flues 14 and 15 in each side wall 2 are staggered with respect to the correspondingly designated flues in the other side wall. The tops of the flues 15 are, in operation, partially or entirely closed by loose tiles 19; or by a built-in damper (not shown) so as to maintain a slight plus pressure in the furnace.

Due to the construction and arrangement of the flues 14 with reference to the hearth and combustion chamber and due to the particular arrangement of the burners 16 with reference to such flues, it will be evident that each burner, as it discharges into the upper portion of a flue 14, produces an inspirating effect up through such flue, thus causing a circulation of heating gases through the slots or flues B beneath the hearth and upwardly through the flues 14 and across the combustion chamber to the opposite side thereof. The arrangement of the flues and burners produces a slight whirling action of the flames and gaseous products of combustion and a circulation of the products of combustion across the combustion chamber, beneath the hearth, and upwardly through the flues 14. The excess gases are forced out through the flues 15.

Hearth construction

The hearth comprises a stationary grid consisting of a plurality of longitudinally extending sectional rails and a vertically movable and horizontally reciprocable grid consisting of a plurality of like rails interposed between the rails of the stationary grid and suitably supported for the vertical and reciprocatory movements referred to. The stationary grid will be described first. This grid consists of a suitable number of refractory blocks, each supported on the bottom 3 of the furnace proper and each block having at its top a special heat-resisting metal-alloy chair for the reception of the interengaging ends of a pair of rail sections. The construction of this grid and of the supports therefor is shown more particularly in Figs. 3, 4, 5 and 18 to 20 inclusive, wherein 20 denotes the rail-supporting blocks, which are shown as frusto-pyramidal in shape, these blocks being shown as spaced apart by transverse blocks 21. The top of each block 20 is flattened to provide a support for the base of a forked metal chair which receives and retains an end of one of the two rail sections whose ends are jointly supported by such chair. Each chair is indicated generally at 22 and comprises a base 23 which is adapted to rest on top of one of the blocks 20 and which is provided with a stem 24 adapted to enter a vertical opening provided therefor in such block. From opposite ends of the base 23 there project forks 25, which forks are adapted to engage slots $26^a$ provided between ribs $26^b$ carried by the forked end of one of the rail sections 26—see Figs. 14 and 15.

It will be noted, from Figs. 14 and 15, that each rail section 26 has at one end an elongated slot $26^c$ and at its opposite end a tongue $26^d$, the construction being such that the tongue at one end of a rail section will be received within the slot of the adjacent end of another rail section; and the lengths of the rail sections are such that the overlapping ends of adjacent rail sections are supported by the blocks 20 through the special chair supports 22. These special supports, as well as the rail sections, are made of a heat resisting material, such as a nickel-chromium alloy, which enables the supports and rails to withstand, without warping, the tempera-

Movable grid

The movable grid, by which the articles are lifted, moved horizontally forwardly and deposited in such advanced position upon the fixed grid, will now be described. This movable grid consists generally of a plurality of rail sections 26, preferably identical with the rail sections described in connection with the stationary grid and having their overlapping ends supported on chairs carried by transverse beams, with means for raising the said beams, thereby to elevate the rails carried thereby from a position below the fixed rails to a position above the latter; to move the beams and rails thus elevated horizontally with respect to the fixed grid; to lower the beams and their rails to a position below the fixed grid; and then to return the beams and rails thus lowered to their first position. It will be noted that the bodies of the rail sections are each in the form of a small I-beam with the flanges at the top and the bottom. This enables the sections to be inverted, if warped, thereby to prolong their lives.

Suitably supported on posts (to be described hereinafter) is a series of transverse beams 27. These beams are each preferably located approximately midway between adjacent transverse series of blocks 20, 21; and, as the overlapping ends of the rail sections are supported by these beams, this insures a proper breaking of joints between the rail sections of the movable grid and the rail sections of the stationary grid.

Each transverse beam 27 is shown as a structural member of I-beam section having its central portion of greater depth than its ends, the upper flange 27ª supporting and having preferably cast therewith a plurality of transversely spaced supporting chairs 27ᵇ each having transversely spaced pairs of forks 27ᶜ at its upper end, each pair of forks providing therebetween a support 27ᵈ for the overlapping ends of the rail sections. These forks engage the slots 26ª and ribs 26ᵇ of the rail sections 26 in the same manner as do the forks 25 on the chairs 22 of the stationary grid; and the tongue 26ᵈ at the end of one of the rail sections 26 enters the groove or slot 26ᵉ provided therefor in the adjacent end of the next rail section, which end is engaged by the forks 27ᶜ—see Figs. 16 and 17.

Each beam 27 is carried by a pair of posts 28 the bottoms of which are supported by composite cross beams 30, and these latter beams are raised and lowered by mechanism which will be described hereinafter. Each post 28 has its upper end provided with forks 28ª which are adapted to pass between lugs 27ᵉ carried by opposite sides of the top and bottom flanges of a beam 27, adjacent to one end of the latter; and a seat 28ᵇ is provided at the bottoms of these forks for the bottom flange of such beam. While each post 28 is shown as provided with the forks 28ª, only one end of each beam 27 is provided with the lugs 27ᵉ, the opposite end being slidably seated on top of and between the forks of the other post. This anchors each beam 27, and at the same time allows for expansion and contraction thereof without distortion thereof and/or of the supporting posts. The posts 28, beams 27, and the rail engaging chairs 27ᵇ are made of heat-resistant material, such as a nickel-chromium alloy, which is also employed for the rails themselves and for the chairs 22.

Reference has been made to the composite cross beams 30 by which the posts 28 are supported. Each composite beam consists of a pair of channel members 30ª arranged back to back and spaced apart and having their ends suitably secured to longitudinal beams 31—see Figs. 3, 16 and 17. The bottom of each post is received within a supporting member comprising a socket 32ª carried by the upper ends of a pair of curved arms 32 projecting upwardly from a web 33, the upper ends of the arms 32 projecting above the flanges of the individual beams 30 and each having lugs 32ª adapted to engage the said flanges, thereby to support the socket carrying member on the tops of said flanges, with the socket elevated thereabove. Each post 28 is vertically adjustable within its socket 31 by means of a set screw 34 threaded into the bottom of the socket, with its operating end located between the arms 32, whereby it is accessible for adjustment thereby to raise and lower the post. Each post is clamped in its vertically adjusted position within its socket by means of a lateral set screw 35. At its bottom, the web 33 is flanged outwardly to form a base, as shown at 33ª, and each socket-carrying member is firmly secured in proper laterally adjusted position to and upon the tops of the beam members 30 by means of bolts 36 having their heads engaging the top of the opposite sides of the base flange 33ª, with the shanks of the bolts extending through a clamping plate 37 which engages the lower flanges of the beam members 30, the socket member and the clamping plate being drawn toward each other by means of the nuts 36ª on said bolts. The construction of the cross beams 30 and the manner of mounting the posts 28 thereon facilitates the quick and convenient positioning of the posts with reference to the said cross members and with reference to the cross beams 27 thereabove.

As pointed out hereinbefore, the transverse beams 30 are moved vertically, together with the movable grid; are moved horizontally rearwardly or toward the delivery end of the furnace for a predetermined distance; are then moved downwardly to bring the movable grid below the stationary grid and to deposit the articles upon the latter grid; and are then moved horizontally forwardly (or toward the charging end of the furnace) to their original position. For the purpose of permitting this movement, it is necessary to provide the refractory bottom 3 of the furnace with longitudinal slots 38, each of sufficient length to accommodate the traversing movements of the posts 28. In order to prevent the escape of heat or gases of combustion during these movements, as well as to prevent the accumulation of scale and sediment in said slots, we provide the following construction—see Figs. 3, 4, 5 and 28–31. 39 denotes the depressed central portion of a sheet metal plate having side flanges 39$^a$ by which the plate is secured to the sheathing 6 for the bottom of the furnace, the said plate being of sufficient length and width to cover entirely the bottom of the slot 38 with which it is to cooperate. It will be noted that the depressed central portion 39 of each plate is provided with an elongated slot 39$^b$, adapted to register with the slot 38 thereabove. The slot 39$^b$ is of a width to receive therein a post 28. The plates 39, 39$^a$ are interposed between the adjacent ends of the proximate supporting blocks 8$^c$. Slidably mounted in the depressed portion of each plate 39 is a plate 40 having a central opening 40$^a$ snugly fitting the post 28 and being of the proper width to fit within the depressed portion of the former plate, the sides of such depressed portion forming guides for the sides of the plate 40. Each plate 40 is of sufficient length to enable it to cover the slot 39$^b$ during the horizontal movements of the post which extends therethrough.

For the purpose of closing the upper ends of the slots 38 during the reciprocatory movements of the posts 28, we provide the following construction: 41 denotes generally a plate having side flanges 41$^a$ and adapted to rest upon the floor of the furnace on opposite sides of a slot 38 and having in the body thereof a slot 41$^b$ substantially coextensive in length with the slot 38 with which it cooperates. Each plate 41 is anchored in place by means of end flanges 41$^c$ engaging the corresponding ends of the slot 38. The flanges 41$^a$ constitute retaining guides for a sliding plate 42 which has a central opening 42$^a$ for the cooperating post 28 and which is of a width to be received within and guided by the flanges 41$^a$ and which is of sufficient length to cover the central slot 41$^b$ during the to-and-fro movements of the post.

It will be noted that the furnace is provided with a platform at the front or receiving end thereof, which platform comprises a plurality of fixed rails 43 extending outwardly from the furnace front and constituting extensions of the rails of the stationary grid— see Figs. 1 and 2. The front and rear ends of these rails are suitably supported by front and rear transverse members of the platform, the front of the platform being supported by means of vertical posts 44, the upper ends of these posts in turn supporting a transverse structural member 45, which may in turn constitute the support for the front ends of the rails 43.

The rails 46 which constitute outward extensions of the rails of the movable grid within the furnace are supported in slots provided at the upper ends of chairs 47 carried by beams 47$^a$ supported on the upper ends of transverse posts 48, which posts are supported on the same longitudinal beams 31 which support the posts 28 within the furnace. The parts 43—48, being located outside the furnace, are not subjected to the intense heat which will exist within the latter and hence need not be made of any special heat-resistant material. The articles placed upon the platform are conveyed by the movable rails 46 into the furnace proper through the swinging doors 49, which are pivoted at their upper edges to the upper edges 49$^a$ of the furnace opening and the bodies of which doors extend into the furnace, whereby the doors may be swung rearwardly and upwardly by the articles passing therebeneath, but will close by gravity as soon as the articles pass therebeneath and thereby.

*Lifting and traversing mechanism for movable grid*

The operating portions of the mechanism referred to are located outside the furnace and largely below the same. The mechanism consists generally of the beams 30, the movable grid carrying posts supported therefrom, and the means for raising and lowering said beams and for reciprocating the said beams, thereby to cause the articles supported on the movable grid to traverse the furnace. The mechanism and the connections by which these results are accomplished are shown more particularly in Figs. 1, 1$^a$, 2, 3, Figs. 6–11 inclusive, and Figs. 21–27 inclusive.

50 denotes a motor driving a shaft 51 which, through suitable reduction gearing (not shown) in a housing 51$^a$ drives a shaft 52. The shaft 52 is provided within the housing 53 with a mutilated pinion 54, 180° in extent, which pinion is adapted to engage alternately the pinion 55 on the shaft 56 and the pinion 57 on the shaft 58. The shaft 56 operates the means for raising and lowering the beams 31 and the movable grid supported thereby, while the shaft 58 operates to reciprocate the said beams and the grid supported thereby during the periods between their elevation and depression by the shaft 56. The housing 53 is mounted on a driving base 59 extending transversely of the platform and supporting at one end the motor and also supporting on opposite sides of the housing 53 the brackets 60 for the shaft 58 which is provided with a coupling 58ª—see Fig. 2. The shaft 56 has cranks 61 connected to opposite ends thereof. Each crank is connected by a connecting rod 62 to a pin 62ª between the ends of the arms 63, 63ª of a bell-crank lever, each lever having the arms 63, 63ª and 65 rigid with the rock shaft 64 supported in bearings 64ª on the base 59 (see Figs. 6–8).

Each bell crank lever is formed as a strong casting having another arm 65 laterally and angularly spaced from the arms 63, 63ª, and connected to said arms 63, 63ª by the shaft 64. The upper end of the arm 65 is connected to one end of a sectional pull rod 66, the connection being conveniently made by a threaded stud 67 pivotally connected to the upper end of the arm 65 by a pin 67ª and to which stud the internally threaded end of the adjacent pull rod section is connected. A stud 68 is mounted in the arms 65 and 63ª and supports a flanged roller 69, which is adapted to engage a wear plate 70 on the bottom flange of the beam 31 thereabove. By rotating the crank 61, it will be evident that each bell-crank casting will be rocked about its pivotal support 64, thereby to raise and lower the beams 31 thereabove.

In order to provide for lifting the beams 31 throughout their lengths, the sectional pull rod 66 is employed and at suitable intervals, corresponding to the convenient length of the pull rod sections, the furnace is provided on opposite sides thereof with bell crank castings, similar to the bell crank castings just described, but omitting the arm 63, the arm 65ª corresponding to the arm 65 and extending into a slot 72 in a connecting member 71 and being pivotally connected to said member by means of a pin 73 extending across said slot (see Figs. 9, 10, 11 and 32). The opposite ends of each connecting member 71 are provided with reversely threaded extensions 74 which are threaded into the adjacent ends of the pull rod sections 66. Each of the supplemental bell crank castings is provided with a lifting roller 69ª, preferably identical with the lifting rollers 69 and carried by the stud 68ª mounted in the arms 65ª and 63ᵇ. Each supplemental bell-crank lever casting is connected to a shaft 75 mounted in the upper ends of a pair of triangular supports 76 carried by an arched bracket base 77 having base flanges 78 whereby each bracket may be fastened to the foundation 7 by means of bolts 79.

In order to relieve the bolts 79 of shearing strains due to the operation of the pull rod, the following bracing construction is provided. 80 denotes an inverted channel beam on each side of the furnace and each secured in any suitable manner at its front end to the drive base frame 59. Each of these channels extends to and through all of the brackets 76, and serves as a thrust member for transmitting to the base 59 the strains imparted to the brackets by the pull rod and the bell cranks connected therewith. This transmission of strains is effected in each case by securing to the top of each beam 80 in front of the bracket a thrust plate 81, there being provided between the front of the upwardly arched base of each bracket and the rear of each block 81 a transversely tapered space for the reception of a block 82. The block 82 has one of its sides 82ª beveled to correspond to the beveled side 81ª of a thrust block; and each block 82 is provided with a transverse slot 83 which is adapted to receive a bolt 84, threaded into the top of the channel member 80, the slot 83 permitting the adjustment of the wedge block 82 so that the latter may transmit thrust from the bracket 77 to the block 82, thence to the channel member 80 and eventually to the drive base frame 59.

*Means for reciprocating the movable grid*

Secured to the shaft 58 is a crank 84 (see Figs. 1 and 2). A connecting rod 85 is pivotally connected at one end to said crank, as shown at 85ª, and its opposite end is pivotally connected to the upper end of an arm 86, as by means of a pin 87 (see Fig. 2). The lower end of the arm 86 is rigidly connected to the rock shaft 88; and secured to opposite ends of said rock shaft are hubs 89, each having a pair of upwardly extending arms 90, each pair of arms having their upper ends connected by a pin 91 extending through a sliding block 92 mounted in a vertical fork 93 in a driving block 94 secured to the corresponding beam 31. It will be evident that, by the rotation of the shaft 58, the arm 86 will be rocked, thereby to rock the shaft 88 and the arms 90, which will cause the beams 31 to be traversed or moved forwardly and rearwardly, together with the movable grids supported thereby.

Reference has been made hereinbefore to the particular means for driving the shafts 56 and 58, it being noted that this driving is accomplished by a segmental pinion 54 on the shaft 52, the said pinion being of such extent as to impart alternately movements of 180° to the shafts 56 and 58. The object of so operating these shafts is to insure that the operation of raising and lowering and reciprocating the movable grid shall occur in the following order, assuming that the segment 54 first meshes with the pinion 55 and that the beams 31 are in their lowermost position.

The shaft 56 will be given a rotation of 180°, which will rock the bell-crank castings, moving the beams 31 vertically and the parts connected thereto, thereby elevating the movable grid and bringing the faces of the upper surfaces of the rails thereof preferably about 1½ inches above the upper surfaces of the rails of the fixed rib. At the end of this movement, the mutilated pinion engages the pinion 57, which will rotate the shaft 58 one-half revolution. This will move the rails 31 a complete stroke horizontally and rearwardly. The mutilated pinion will then re-engage the pinion 55, which will rock the bell crank castings in the opposite direction and cause them to drop to the position shown in Figs. 6 and 9, thereby lowering the movable grid vertically so that the tops of the rails thereof will be preferably about 1½ inches below the tops of the rails on the fixed grid. Immediately thereafter, the mutilated pinion will engage the pinion 57 and will rotate the shaft 58, thereby to move the rails 31 and the parts connected thereto horizontally toward the receiving end of the furnace.

In Figs. 1 and 1ª of the drawings, the parts are shown in the positions which they occupy at the end of the lowering movement of the movable grid following the conveying movement of the same. It will be noted that, at the end of this operation, the crank 61 and connecting rod 62 extend downwardly from the shaft 56, while the crank 84 extends rearwardly from the shaft 58, the crank pin 85ª being on the horizontal center with the shaft 58. The connections are such that the beams 31 and the movable grid are raised with a movement which first accelerates and then decelerates as the cranks 61 reach their upper centers; also that the lowering movement which is imparted to the beams and the movable grid is one which first accelerates and then decelerates toward the end of the lowering movement. This prevents displacement and jarring of the articles on the grid and also relieves the machinery from jarring when stopping and starting the raising and lowering movement. It also enables the power to be transmitted from the shaft 56 to the load in a most effective manner.

It will be noted further that, due to the manner of connecting the crank 84 and connecting rod 85 to the beams 31, the latter are moved forwardly and rearwardly with a motion which is first accelerated and is then decelerated as the beams and connected parts reach the end of the forward or rearward stroke. This also secures the same result as to avoiding the jarring of the machinery and the articles on the movable grid as does the manner of raising and lowering the grid.

Reference has been made hereinbefore to the fact that there will be no overlapping of the movements of the shafts 56 and 58. This prevents the dragging of the articles as they are picked up from the fixed grid by the movable grid and are deposited by the movable grid upon the fixed grid. In order to prevent any "overthrow" of either of the shafts 56 and 58 by the shaft 52, we provide means within the housing 53 and in connection with the gearing and shafting therein for positively preventing such "overthrow". Secured on the hub of each of the pinions 55 and 57 is a disk, designated 95 and 96, respectively. The disk 95 is provided with diametrically opposed notches 95ª in the periphery thereof and the disk 96 with diametrically opposed notches 96ª in the periphery thereof, a line connecting the centers of the notches in one of said disks being at right angles to a line connecting the centers of the notches in the other of said disks. Projecting inwardly from the top of one side of the bottom section of the housing 53 are lugs 97—see Figs. 21 and 24. These lugs are arranged between the disks 95, 96 and the hub of the pinion 54. 98 denotes a supporting member having its lower end forked to clear the hub 54ª of the pinion 54 and having on opposite sides of such fork lugs 99 by means of which the supporting member is secured to the lugs 97, by bolts 100. The supporting member 98 is preferably a casting and has at the top thereof a bearing boss 98ª having an opening 98ᵇ therethrough for the reception of a stud bolt 101 on which a walking beam 102 is pivoted, the said walking beam having a central opening 102ª therethrough for the reception of the enlarged portion of the stud 101 and for the bushing 103. The legs of the walking beam extend downwardly from the pivot and each leg is forked at its lower end, as shown at 102ᵇ, for the reception of a roller 104 journaled in such fork by a pin 105. The parts are so proportioned that, when one of the rollers 104 is in a notch in either of the disks 95 or 96, the roller at the opposite end of the walking beam is riding on the periphery of the other disk midway between the notches therein. In Fig. 21, the shaft 56 is being driven by the engagement of the mutilated pinion 54 with the pinion 55, while the pinion 57 is held against rotation in the meantime by the roller 104 engaging the notch 96ª therein. As soon as the mutilated pinion shall have disengaged the pinion 55 and shall have engaged the pinion 57, the movement of the latter pinion will disengage the roller 104 from the notch 96ª while the roller at the opposite end of the walking beam will be projected into one of the notches 95ª in the disk 95. Obviously, as soon as the pinion 54 shall have disengaged the pinion 57, the reverse operation of the walking beam will occur, locking the pinion 57 against further rotation while unlocking the pinion 55 for operation by the pinion 54. Due to this construction, each of the four movements comprising a complete cycle of the movable grid will be positively separated from the others. When the beams 31 are elevated, there will be no conveying movement imparted to said beams until they shall have completed their upward movement; until the beams shall have completed their conveying movement, no lowering movement will be imparted thereto; and, until the beams shall have completed such lowering movement, there will be no longitudinal or horizontal movement of said beams toward their original position. The arrangement described accomplishes these results while insuring proper engagement of the teeth of the driving and driven pinions.

The means for raising and lowering the movable grid and for horizontally reciprocating the same possesses additional advantages which will now be pointed out. By reference to Fig. 1, it will be seen that, when the beams 31 are in their lowered position, they are supported by the rollers of the bell crank castings therebeneath and that, at this time, the crank pins $61^a$ and the shaft 56 are on center, with the connecting rod 62 extending vertically downwardly from the crank pins. Furthermore, when the beams 31 are elevated by rotating the shaft 56 180° in the manner hereinbefore described, the crank pins $61^a$ will be on their upper centers with respect to the shaft 56, whereby the beams will be hung from said shaft and the connecting rods, with the crank pins and the shaft on center. Due to this arrangement, the weight of the movable grid is carried at all times by the rollers 69 and $69^a$; and the grid is supported in the most effective manner at the end of each raising and lowering movement of the shaft 56. Furthermore, because of the locking arrangement shown in Fig. 21, the shaft 56 is positively locked in its most ideal supporting position at the beginning and at the end of the intermittent movement thereof.

The connection between the shaft 58 and the beams 31 is such that, at the beginning and at the end of each reciprocatory movement of the said beams, the crank pin $85^a$ and the center of the shaft 58 will be on the same horizontal center, the pin being on one side of the shaft center at the beginning of the stroke and at the opposite side of such center at the end of the stroke. Furthermore, as has been pointed out hereinbefore, the shaft 58 is automatically locked with the crank pin $85^a$ and shaft 58 on such horizontal centers.

Reference has been made hereinbefore to the loading platform. It will be obvious that articles placed thereon will be moved into the furnace proper past the doors 49 and will be conveyed through said furnace, being subjected to heat treatment therein, the length of which treatment will be determined by the speed at which the articles are conveyed through the furnace and the length of the furnace. Obviously the speed may be varied by varying the length of the horizontal strokes of the movable grid. This length of stroke may be varied by varying the effective throw of the crank 84 by any suitable means.

The delivery end of the furnace (see Fig. $1^a$) is shown as provided with a vertically movable door 106, sliding between guides 107 and connected by a suitable flexible device 108 with the segment $109^a$ of a lever 109 which is pivotally supported intermediate its ends from a bracket 110 on top of the furnace. The lever is provided with an extension $109^b$ of the arm opposite the segment, which extension is provided with a counterweight 111. The arm including the extension is connected by a connecting rod 112 with a crank 113 driven by the shaft 114 of a motor 115, the circuit of which may be opened and closed by contact of the delivery end of the movable grid, or of an article thereon, with a device for opening and closing the motor circuit.

In Fig. 33 there is shown a modification of the means for imparting to-and-fro movement to the beams 31 and the movable grid supported thereby wherein the upper ends of long arms $90^a$ rigid with the shaft 88 are connected to long connecting rods 116, the opposite end of each of said connecting rods being pivotally connected to one of the posts 48 adjacent to the front or receiving end of the furnace, as indicated at 117. By varying the length of the arms $90^a$ and/or the length of the crank 84, the length of the traversing stroke of the movable grid may be correspondingly varied. The same result may be accomplished by like changes in the lengths of the arms 90 and/or the length of the cranks 84 in the preceding embodiment of our invention. Furthermore, like changes in the vertical movements of the movable grid may be obtained by varying the lengths of the cranks 69; also by varying the lengths of the arms 63 and/or the arms $63^a$.

Among the important advantages due to the construction and arrangement of the various parts of our furnace are the following:—

(a) Operating the movable conveyor grid in such manner that the main supporting parts and the operating mechanism therefor are located outside and beneath the furnace proper, where they are not exposed to temperatures sufficient to cause deterioration or distortion.

(b) Constructing and supporting the rails of the movable and stationary grids in such manner that provision is made for expansion and contraction of such rails without distortion or other injury.

(c) Constructing the parts of the fixed and movable grids which are exposed to high temperatures, of material capable of withstanding such temperatures without injury.

(d) Employing posts projected through slots in the bottom of the furnace for transmitting the movements of the supporting mechanism below and outside the furnace to the movable grid within the furnace.

(e) Conveniently and adjustably supporting the posts upon the transverse beams thereneath as well as providing for their vertical adjustment whereby they may support the beams 27 and the rails thereon in proper relation to the rails on the fixed grid.

(f) Sealing the tops and bottoms of the furnace slots through which the movable grid-supporting posts project.

(g) Constructing the lifting mechanism in such manner that the maximum lifting power is exerted upon the beams 31 and the parts attached thereto at the beginning of the lifting operation, the construction and arrangement of parts by which this result is accomplished also relieving the machinery from jars on stopping and starting the lifting mechanism as well as relieving the articles on the movable grid from such jarring movements.

(h) Operating intermittently, through a continually revolving drive shaft, the raising, lowering and traversing mechanism, without any overlapping of motions.

(i) The ability (due to the forked driving blocks or castings 94) to move the beams 31 positively back and forward while leaving them free to travel up and down in a true vertical direction at the end of each horizontal stroke.

(j) The ability, due to the arrangement of the hearth, the flues 14 and 15, and the burners 16, to obtain an extremely uniform application of heat both above and below the hearth, whereby the articles thereon are given a correspondingly uniform heat treatment.

(k) Employing main and supplemental bell crank levers for lifting the beams 31 in such manner that the stresses at each crank are confined to the bell crank casting connected thereto while the stresses exerted on the supplemental lifters are transmitted to the main driving frame.

(l) Owing to the arrangement of the lifting mechanism, the crank pins 61ª are on their lower centers, or in a direct line with and below the center of the shaft 56, when the beams 31 are in their lowered position, and the connecting rods also extend vertically downwardly from the pins 61ª, whereby the beams are supported by such rods through the rollers 69, 69ª. Furthermore, when the beams 31 are elevated, by a half rotation of the shaft 56, the cranks 61 extend upwardly, with the crank pins 61ª on their upper centers above the shaft 56, and the connecting rods 62 extend vertically downwardly to and from their respective crank pins. This arrangement, coupled with the automatic locking of the shaft 56 with the crank pins on their upper or lower centers, results in an ideal manner of supporting the movable grid at the ends of the raising and lowering movements thereof.

Having thus described our invention, what we claim is:

1. The combination, with a furnace having a stationary work support, of a movable grid comprising a plurality of transversely extending beams and rails supported by said beams, and means including posts extending through the bottom of the furnace for raising and lowering the said beams, there being two transversely spaced posts connected with each such beam, one of such posts and a portion of the beam supported thereby having interengaging means preventing movement of the beam transversely of the furnace with respect to said post and the other of such posts being slidably connected with such beam.

2. The combination, with a furnace having a stationary work support, of a movable grid comprising a plurality of transversely extending beams and rails supported by said beams, means including a pair of transversely spaced posts for each beam extending through the bottom of said furnace, each of said posts having a forked chair at its upper end, the forks of one of said chairs engaging vertically extending grooves or recesses on the opposite sides of the portion of the beam supported by said chair, the portion of the beam which cooperates with the chair of the other post being adapted to slide relative to said post in response to temperature changes.

3. A hearth for a furnace of the character described comprising a plurality of laterally spaced longitudinally extending rails each consisting of a plurality of rail sections, each section having a tongue at one end thereof and a slot at the opposite end adapted to receive a similar tongue of an adjacent section, and supports for such overlapping rail-section ends, each support and the slotted portion of a rail section being provided with interengaging means thereby to hold the slotted end of each rail section in engagement with a support while permitting the tongue of the adjacent rail section to move relatively to such slotted end in response to temperature changes.

4. A hearth for a furnace of the character described comprising a plurality of laterally spaced longitudinally extending rails each consisting of a plurality of rail sections, each section having a tongue at one end thereof and a slot at the opposite end adapted to receive a similar tongue of an adjacent section, and supports for such overlapping rail-section ends, each support comprising a chair having vertically extending forks and the slotted end of each rail section being provided with longitudinally spaced projections one opposite sides thereof for the reception of said forks, the tongue of the adjacent rail section being adapted to enter the slot and rest on said chair, whereby the slotted end of each rail section is held by the said chair while the tongue-provided end of the adjacent section is free to move in said slot in response to temperature changes.

5. The combination, with a furnace having a stationary work support, of a plurality of transversely extending beams each having a plurality of laterally spaced forked rail-supporting chairs projecting upwardly therefrom, means for raising and lowering the said beams, and longitudinally extending rails supported by the said chairs and each comprising a plurality of rail sections, one end of each of said rail sections being longitudinally slotted and provided with vertically extending slots on opposite sides thereof adapted to be engaged by the forks of a corresponding chair and the other end of each such rail section being provided with a tongue adapted to enter and slide within the slot of the next adjacent rail section and to be supported by the chair which engages the slots on the sides of such adjacent section.

6. The combination, with a furnace having a stationary work support, of a movable grid comprising a plurality of longitudinally extending rails, means including posts for supporting the movable rails, each post extending through the bottom of the furnace, a transversely adjustable support for each post having an upwardly extending socket, and means for supporting each post in a vertically adjusted position within its socket.

7. The combination, with a furnace having a stationary work support, of a movable grid comprising a plurality of transversely extending beams and longitudinally extending rails supported thereby, means including transversely extending beams arranged below the former beams for raising and lowering the movable grid, posts connected with the first mentioned beams and extending through the bottom of the furnace, and means for adjustably connecting the lower ends of said posts to their respective transverse supporting beams.

8. The combination, with a furnace having a stationary work support, of a movable grid comprising a plurality of transversely extending beams and longitudinally extending rails supported thereby, means including pairs of spaced transversely extending beams for raising and lowering the movable grid, a pair of posts connected with each of the first mentioned beams and extending through the bottom of the furnace, a socketed supporting member for the lower end of each post having a base extending between pairs of such individual beams and adjustably secured thereto, means connected with each socket for vertically adjusting the position of a post therein, and means associated with each socket for securing the post therein in such adjusted position.

9. The combination, with a furnace having a stationary work support, of a movable grid comprising a plurality of transversely extending beams and longitudinally extending rails supported thereby, means including spaced transversely extending beams for raising and lowering the movable grid, a post connected with each of the first mentioned beams and extending through the bottom of the furnace, a socketed supporting member for the lower end of each post having a base adjustably secured to one of such transverse supporting beams, and means associated with each socket for securing a post in vertically adjusted position therein.

10. A furnace conveyor comprising a work support and a work-moving member disposed side by side, a shaft, a mutilated pinion thereon, and shafts arranged on opposite sides of the first mentioned shaft and each having a pinion adapted to mesh with such mutilated pinion, connections between the second shaft and the work-moving member for raising and lowering the same, and connections between the third shaft and the work-moving member for moving the same longitudinally in opposite directions.

11. A furnace conveyor comprising a work support and a work-moving member disposed side by side, a shaft, a mutilated pinion thereon, and shafts arranged on opposite sides of the first mentioned shaft and each having a pinion adapted to mesh with such mutilated pinion, connections between the second shaft and the work-moving member for raising and lowering the same, connections between the third shaft and the work-moving member for moving the same longitudinally in opposite directions, and means for preventing the simultaneous rotation of the second and third shafts.

12. The combination, with a furnace having a stationary work support, of a movable work support, said movable work support comprising posts projecting through slots in the furnace bottom, means engaging the bottoms of said posts for raising, lowering, and horizontally reciprocating the same, a plate covering one side of each slot and having a slot therein of sufficient length to accommodate the horizontal movements of the post which operates within the furnace slot, and a plate having an opening through which such post projects and slidably mounted on the first mentioned plate and being of a length sufficient to cover the slot in the first mentioned plate during the reciprocatory movements of the post.

13. The combination, with a furnace having a stationary work support, of a movable work support, said movable work support comprising posts projecting through slots in the furnace bottom, means engaging the bottoms of said posts for raising, lowering, and horizontally reciprocating the same, plates covering the top and the bottom of each furnace slot, each of said plates having a slot therein of sufficient length to accommodate the horizontal reciprocatory movements of the post which operates in such furnace slot, a plate resting on each of the first mentioned plates and each having an opening through which the cooperating post projects, each of the second mentioned plates being slidably supported on one of the first mentioned plates and being of sufficient length to cover the slots in such first mentioned plates during the reciprocatory movements of the post.

14. A furnace of the character described having top, side, end and bottom walls providing a heating chamber therebetween, the bottom of the said chamber being provided with a longitudinally extending work supporting member, means for moving articles along such work supporting member, there being open flues provided below the work supporting member and extending transversely of said chamber, one of the side walls of said furnace being provided with vertical flues communicating at their bottoms with such transverse flues in the bottom of the furnace below the work support, and burners mounted in said side wall and arranged to discharge into the upper end of each of said vertical flues whereby an aspirating effect will be produced in the vertical flues.

15. A furnace of the character described having top, side, end and bottom walls providing a heating chamber therebetween, the bottom of the said chamber being provided with a longitudinally extending work supporting member, means for moving articles along such work supporting member, there being flues provided below the work supporting member and extending transversely of said chamber, the opposite side walls of the furnace being each provided with vertical flues communicating at their bottoms directly with alternate flues in the furnace bottom below the work support, and burners mounted in said side walls and each arranged to discharge into and through the upper end of each of said vertical flues, there also being vertically extending exhaust flues in said walls alternating with the first mentioned vertical flues and communicating at their lower ends directly with the adjacent ends of the corresponding transverse bottom flues.

16. A furnace of the character described having top, side, end and bottom walls providing a heating chamber therebetween, the bottom of the said chamber being provided with a work supporting member, means for moving articles along such work supporting member, one of the side walls of the furnace being provided with vertical flues communicating at their bottoms with the lower portion of the chamber and each having an upwardly and inwardly inclined upper end communicating with the chamber, and burners mounted in such side wall and arranged to discharge into and along the upwardly and inwardly directed end of each of said vertical flues.

17. A furnace of the character described having top, side, end and bottom walls providing a heating chamber therebetween, the bottom of the said chamber being provided with a work supporting member, means for moving articles along such work supporting member, there being flues provided below the work supporting member and extending transversely of said chamber, the opposite side walls of the furnace being each provided with vertical flues communicating at their bottoms directly with alternate flues in the bottom of the furnace below the work support, and burners mounted in said side wall and each arranged to discharge into and through the upper end of each of said vertical flues, there also being vertically extending exhaust flues in said wall alternating with the first mentioned vertical flues and communicating at their lower ends directly with the adjacent ends of the other transverse bottom flues, and the opposite side wall being provided with alternating vertical flues substantially identical with the flues in the first mentioned wall and staggered with respect to the flues in such first mentioned wall and communicating at their lower ends directly with alternate transverse bottom flues.

18. The combination, with a furnace having therein a stationary work support, of a movable work support arranged alongside the stationary work support, means for raising and lowering the movable support, the said means comprising a beam located beneath the furnace, supports for the movable work support extending through the furnace and in turn supported by the said beam, a shaft journaled above the said beam, a crank carried by said shaft, a drive frame below the said crank, a bell crank supported on said drive frame and having angularly spaced arms, a connecting rod connecting the said crank with one of said arms, a roller carried by said bell crank and adapted to engage the under surface of said beam, supplemental bell cranks pivotally supported beneath said beam and each having a roller adapted to engage beneath said beam, a pull rod connected with the other of the arms of the first mentioned bell crank and with corresponding arms on the supplemental bell cranks, and means for transmitting to the drive frame stresses exerted by the action of the pull rod upon the supplemental bell cranks.

19. The combination, with a furnace having therein a stationary work support, of a movable work support arranged alongside the stationary work support, means for raising and lowering the movable support, the said means comprising a beam located beneath the furnace, supports for the movable work support extending through the furnace and in turn supported by the said beam, a shaft journaled above the said beam, a crank carried by said shaft, a drive frame supporting said shaft and crank, a bell crank supported on said frame and having angularly spaced arms, a connecting rod connecting the crank with one of said arms, a roller carried by said bell crank and adapted to engage the under surface of said beam, brackets located beneath the said furnace and the said beam, a supplemental bell crank pivotally supported by each of said brackets, a roller carried by each supplemental bell crank for engaging the lower surfaces of said beam, a sectional pull rod connecting the other arm of the first mentioned bell crank with corresponding arms on the supplemental bell crank, a thrust member secured to the drive frame and extending beneath the said brackets, and means for transferring the thrust imparted to the said brackets to the thrust member.

20. The combination, with a furnace having therein a stationary work support, of a movable work support arranged alongside the stationary work support, means for raising and lowering the movable support, the said means comprising a beam located beneath the furnace, supports for the movable work support extending through the furnace and in turn supported by the said beam, a shaft journaled above the said beam, a crank carried by said shaft, a drive frame supporting said shaft, a bell crank pivotally mounted on said frame and having angularly spaced arms and a roller adapted to engage beneath the bottom of said beam, a connecting rod connecting the crank with one of the said arms, a plurality of supplemental bell cranks arranged beneath the said beam and each carrying a roller adapted to engage beneath said beam, a pull rod connecting the other arm of the first mentioned bell crank with corresponding arms of the supplemental bell cranks, the said pull rod comprising a plurality of sections, slotted members connecting the said sections, and pins extending across the slots of said connecting members and pivotally connecting the operating arms of the supplemental bell cranks thereto.

21. The combination, with a furnace having therein a stationary work support, of a movable work support arranged alongside the stationary work support, means for raising and lowering the movable support, the said means comprising a beam extending longitudinally beneath the furnace, the said means comprising a bell crank having angularly spaced arms and a portion adapted to engage beneath the said beam, supplemental bell cranks each having a portion adapted to engage beneath the said beam, a pull rod connecting the first mentioned bell crank with the supplemental bell cranks, a shaft located above the first mentioned bell crank, a crank carried by said shaft and a connecting rod connecting the crank and the said bell crank, the parts being so connected that the centers of the shaft and of the pivot for the connecting rod will be in a vertical line at the ends of the raising and lowering positions of said shaft.

22. The combination, with a furnace having therein a stationary work support, of a movable work support arranged alongside the stationary work support, means for raising and lowering the movable support, the said means comprising a beam extending longitudinally beneath the furnace and by which the work support is in turn supported, a bell crank having angularly spaced arms and a portion adapted to engage beneath the said beam, supplemental bell cranks each having a portion adapted to engage beneath the said beam, a pull rod connecting the first mentioned bell crank with the supplemental bell cranks, a shaft located above the first mentioned bell crank, a crank carried by said shaft and a connecting rod connecting the crank and the said bell crank, the parts being so arranged that the centers of the shaft and of the crank pin will be in a vertical line at the ends of the raising and lowering positions of said shaft, and means for positively arresting the movement of the shaft at the ends of the raising and lowering movements thereof.

23. The combination, with a furnace having therein a stationary work support, of a movable work support arranged alongside the stationary work support, and means for raising and lowering the movable support, the said means comprising a beam extending longitudinally beneath the furnace and by which the work support is in turn supported, a vertically movable lifting member for said beam, supplemental lifting members for said beam, a pull rod connecting the first mentioned lifting member with the supplemental lifting members, a shaft located above the first mentioned lifting member, a crank carried by said shaft and a connecting rod connecting the crank and the said lifting member, the parts being so arranged that the centers of the shaft and of the crank pin will be in a vertical line at the ends of the raising and lowering positions of said shaft.

24. The combination, with a furnace having therein a stationary work support and a movable work support alongside the stationary work support, of means for raising and lowering the movable work support, the said means comprising a beam extending longitudinally beneath the furnace and means for supporting the work support from said beam, a shaft above the said beam, a crank on said shaft, means comprising a rotatably supported arm for raising and lowering said beam, a connecting rod connecting the crank with said arm, and means for driving the said shaft intermittently 180°, the connections being such that the shaft and the crank pin for the connecting rod are on a vertical center at the beginning and at the end of each such intermittent movement of the shaft.

25. The combination, with a furnace having a stationary work support and a movable work support alongside the stationary work support, of means for horizontally reciprocating the movable work support, the said means comprising a beam, means for supporting the movable work support from the said beam, and means for horizontally reciprocating the said beam, the said means comprising a shaft, a crank connected with said shaft, a connecting rod pivoted to said crank, an arm to which the opposite end of said connecting rod is pivotally connected, a rock shaft to which said arm is connected, a driving block secured to said beam and having a vertical slot therein, a block slidably mounted in said slot, and an arm rigid with the last mentioned shaft and pivotally connected to said block.

26. The combination, with a furnace having a stationary work support and a movable work support alongside the stationary work support, a beam, means for supporting the movable work support from the said beam, a shaft, a crank connected with said shaft, means including a connecting rod pivoted to said crank for horizontally reciprocating the said beam, and means for turning said shaft intermittently 180°, the connections being such that the shaft and the crank pin for the connecting rod will be on the same horizontal center at the beginning and at the end of each intermittent movement of said shaft.

27. The combination, with a furnace having a stationary work support and a movable work support alongside the stationary work support, a beam, means for supporting the movable work support from the said beam, and means for horizontally reciprocating the said beam, the said means comprising a shaft, a crank connected with said shaft, a connecting rod pivoted to said crank, connections between said rod and said beam, means for turning said shaft intermittently 180°, and means for locking the shaft at the end of each such intermittent motion thereof.

28. The combination, with a furnace having a stationary work support, of a plurality of transversely extending beams each having a plurality of laterally spaced rail-supporting members projecting upwardly therefrom, means for raising and lowering the said beams, and longitudinally extending rails supported by the said members and each comprising a plurality of rail sections, one end of each of said rail sections being longitudinally slotted and the other end of each such rail section being provided with a tongue adapted to enter and slide within the slot of the next adjacent rail section, each rail supporting member and one end of each rail section being provided the one with vertically extending slots located on opposite sides thereof and the other with means adapted to enter said slots.

In testimony whereof, we hereunto affix our signatures.
HARRY P. McCANN.
HUBERT E. BAKER.